(12) United States Patent
Hadsall

(10) Patent No.: US 10,503,935 B1
(45) Date of Patent: *Dec. 10, 2019

(54) SYSTEM AND METHOD FOR CONCEALING SENSITIVE DATA ON A COMPUTING DEVICE

(71) Applicant: State Farm Mutual Automobile Insurance Company, Bloomington, IL (US)

(72) Inventor: Jacob L. Hadsall, Bloomington, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/001,263

(22) Filed: Jun. 6, 2018

Related U.S. Application Data

(63) Continuation of application No. 15/864,828, filed on Jan. 8, 2018, now Pat. No. 10,043,014, which is a
(Continued)

(51) Int. Cl.
*G06F 21/00* (2013.01)
*G06F 21/84* (2013.01)
(Continued)

(52) U.S. Cl.
CPC .............. *G06F 21/84* (2013.01); *G06F 21/32* (2013.01); *G06F 21/6245* (2013.01);
(Continued)

(58) Field of Classification Search
None
See application file for complete search history.

(56) References Cited

U.S. PATENT DOCUMENTS 6,421,453 B1* 7/2002 Kanevsky ............. G06F 21/316
340/5.2
7,953,671 B2 5/2011 Bishop et al.
(Continued)

OTHER PUBLICATIONS

Xu, Wei et al. Detecting and Classifying Blurred Image Regions. 2013 IEEE International Conference on Multimedia and Expo (ICME). https://ieeexplore.ieee.org/stamp/stamp.jsp?tp=&arnumber=6607422 (Year: 2013).*

(Continued)

*Primary Examiner* — Jeremiah L Avery
(74) *Attorney, Agent, or Firm* — Marshall, Gerstein & Borun LLP

(57) ABSTRACT

A computer-implemented method may hide sensitive information including when no one is looking at a display screen of a client computing device, such as sensitive information relating to auto, home, life, or renters insurance, banking, and/or vehicle loans. In one aspect, the method may determine that confidential or sensitive information is being displayed on a display screen of a computing device of a user. The method may also collect image data from a front facing camera in communication with the computing device, and determine that zero or two or more people are viewing the display screen for more than a threshold duration of at least one second. The method may further blur or obscure the confidential or sensitive information being displayed on the display screen when it is determined that the zero or two or more people are viewing the display screen for more than the threshold duration.

18 Claims, 10 Drawing Sheets

Related U.S. Application Data continuation of application No. 14/833,263, filed on Aug. 24, 2015, now Pat. No. 9,898,610.

(60) Provisional application No. 62/196,685, filed on Jul. 24, 2015, provisional application No. 62/192,338, filed on Jul. 14, 2015, provisional application No. 62/072,231, filed on Oct. 29, 2014, provisional application No. 62/067,333, filed on Oct. 22, 2014.

(51) Int. Cl.
*G06F 21/62* (2013.01)
*G06F 21/32* (2013.01)
*G06K 9/00* (2006.01)
*G09G 5/00* (2006.01)
*G06K 9/20* (2006.01)

(52) U.S. Cl.
CPC .......... *G06K 9/00087* (2013.01); *G06K 9/20* (2013.01); *G09G 5/003* (2013.01); *G09G 2358/00* (2013.01)

(56) References Cited

U.S. PATENT DOCUMENTS

| | | | |
|---|---|---|---|
| 8,462,949 | B2 | 6/2013 | Anderson et al. |
| 8,678,275 | B1 | 3/2014 | Bowen et al. |
| 9,092,605 | B2* | 7/2015 | Sambamurthy ......... G06F 21/32 |
| 2010/0124363 | A1 | 5/2010 | Ek et al. |
| 2010/0205667 | A1* | 8/2010 | Anderson ............... G06F 3/013 |
| | | | 726/19 |
| 2012/0019361 | A1* | 1/2012 | Ben Ayed ............... G06F 21/32 |
| | | | 340/5.83 |
| 2012/0139693 | A1* | 6/2012 | Zucker .................... G06F 21/10 |
| | | | 340/5.2 |
| 2013/0144901 | A1 | 6/2013 | Ho et al. |
| 2013/0298208 | A1* | 11/2013 | Ayed ....................... G06F 21/00 |
| | | | 726/6 |
| 2014/0047560 | A1* | 2/2014 | Meyer ..................... G06F 21/62 |
| | | | 726/28 |
| 2014/0281946 | A1* | 9/2014 | Avni ...................... G06T 1/0021 |
| | | | 715/268 |
| 2014/0304836 | A1* | 10/2014 | Velamoor ............ G06F 21/6209 |
| | | | 726/28 |
| 2015/0033305 | A1* | 1/2015 | Shear ...................... G06F 21/45 |
| | | | 726/11 |
| 2015/0227890 | A1* | 8/2015 | Bednarek ......... G06Q 10/08355 |
| | | | 705/26.81 |
| 2015/0348009 | A1* | 12/2015 | Brown ............... G06Q 20/3227 |
| | | | 705/16 |

OTHER PUBLICATIONS

Wehbi, Bachar et al. Events-Based Security Monitoring Using MMT Tool. 2012 IEEE Fifth International Conference on Software Testing, Verification and Validation. https://ieeexplore.ieee.org/stamp/stamp.jsp?tp=&arnumber=6200200 (Year: 2012).*

Xuan-jing, Shen et al. A blur image blind identify algorithm based on the edge feature. 2011 Third International Conference on Multimedia Information Networking and Security. https://ieeexplore.ieee.org/stamp/stamp.jsp?tp=&arnumber=6103779 (Year: 2011).*

Xiao-tao, Huang; Hong-gang, Wang; Zhi-guo, Yang: Xiang-jun, Liu. A novel prescreening method for UWB SAR target detection using adaptive nonlinear filters. 2005 IEEE International Geoscience and Remote Sensing Symposium. Pub. Date: 2005. http://ieeexplore.ieee.org/stamp/stamp.jsp?tp=&arnumber=1526331.

Moncrieff, Simon; Venkatesh, Svetha; West, Geoff A.W. Dynamic Privacy in Public Surveillance. Computer, vol. 42, Issue: 9. Pub. Date: 2009. http://ieeexplore.ieee.org/stamp/stamp.jsp?tp=&arnumber=5233502.

IBM, "InfoSphere Guardium for Applications," (2015). Retrieved from the Internet at: URL:https://www.ibm.com/developerworks/community/wikis/home?lang=en#!/wiki/Wf32fc3a2c8cb_4b9c_83e4_09b3c6f60e46/page/InfoSphere%20Guardium%20for%20Applications <https://www.ibm.com/developerworks/community/wiis/home?lang=en>.

IDM,"Demo: Dynamic Data Masking Using Guardium for Applications—PeopleSoft Example," (2014). Retrieved from the Internet at URL: <https://www.youtube.com/watch?v=yH0XnR1Crmk&feature=youtu.be>.

IBM Security Guardium for Applications, <http://www-03.ibm.com/software/products/en/ibm-security-guardium-for-applications>, 1 page.

Office Action issued in U.S. Appl. No. 14/833,263 dated Jul. 3, 2017.

Office Action issued in U.S. Appl. No. 14/833,275 dated Jun. 30, 2017.

Miroslav Pajic and Rahul Mangharam, Embedded Virtual Machines fo Robust Wireless Control and Actuation, 2010 16th IEEE Real-time and Embedded Technology and Applications Symposium.

Karim El Defrawy and Claudio Soriente, PEUC-WiN: Privacy Enhancement by User Cooperation in Wireless Networks, 2nd IEEE Workshop on Secure Network Protocols, 2006.

* cited by examiner

SYSTEM AND METHOD FOR CONCEALING SENSITIVE DATA ON A COMPUTING DEVICE

CROSS-REFERENCE TO RELATED APPLICATIONS

This application is a continuation of and claims priority to U.S. patent application Ser. No. 15/864,828, entitled "System And Method For Concealing Sensitive Data On A Computing Device" and filed Jan. 8, 2018, which is a continuation of and claims priority to U.S. patent application Ser. No. 14/833,263 filed on Aug. 24, 2015, entitled "System And Method For Concealing Sensitive Data On A Computing Device," which claims priority to and the benefit of U.S. Provisional Patent Application No. 62/067,333, entitled "System And Method For Concealing Sensitive Data On A Computing Device," filed on Oct. 22, 2014; U.S. Provisional Patent Application No. 62/072,231, entitled "System And Method For Concealing Sensitive Data On A Computing Device," filed on Oct. 29, 2014; U.S. Provisional Patent Application No. 62/192,338, entitled "System And Method For Concealing Sensitive Data On A Computing Device," filed on Jul. 14, 2015; and U.S. Provisional Patent Application No. 62/196,685, entitled "System And Method For Concealing Sensitive Data On A Computing Device," filed on Jul. 24, 2015, the disclosure of each of which is hereby incorporated by reference in its entirety.

FIELD OF THE INVENTION

The present disclosure generally relates to a system and method for determining when sensitive data is displayed within a viewport of a display of a computing device, detecting a biometric identifier of a user of the computing device, detecting a second biometric identifier not associated with the user of the computing device and obscuring the sensitive data displayed within the viewport of the display.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An increasing amount of sensitive data is displayed on mobile devices, such as banking information, e-mail, insurance account information, etc. Combined with the increasing screens sizes of mobile computing devices, it may be possible for a malicious party to look over someone's shoulder (or otherwise eavesdrop), and view sensitive data displayed within the viewport, or viewing region, of the display of a computing device. Although many applications that display sensitive data authenticate a user via a password and user name, these traditional authentication techniques may not prevent others from viewing sensitive data from a distance.

SUMMARY

The present embodiments may dynamically conceal sensitive and/or private data displayed on a display of a computing device. One or more data items may be graphically or visually represented in an application executing on the computing device. A biometric detection service may utilize a camera on the computing device, such as a front facing camera, and may detect when a person other than the user is looking at the device. In one aspect, concealing the sensitive data may prevent a person, such as a malicious third party, from viewing sensitive data displayed on the computing device.

In one aspect, a computer-implemented method for hiding sensitive information including when no one is looking at a display screen may be provided. The method may include (1) determining, by the one or more processors, that confidential or sensitive information is being displayed on a display screen of a computing device of a user; (2) collecting, by the one or more processors, image data from a front facing camera in communication with the computing device of the user; (3) determining, by the one or more processors, that zero people are viewing the display screen or that two or more people are viewing the display screen for more than a threshold duration of at least one second from computer analysis of the collected image data; and/or (4) blurring or obscuring, by the one or more processors, the confidential or sensitive information being displayed on the display screen when it is determined that the zero people are viewing the display screen or that the two or more people are viewing the display screen for more than the threshold duration. The method may include additional, fewer, or alternate actions, including those discussed elsewhere herein.

In another aspect, a computing or mobile device configured to hide sensitive information when no one, including the user, is looking at a display screen may be provided. The computing or mobile device may include one or more processors configured to: (1) determine that confidential or sensitive information is being displayed on a display screen of the computing or mobile device of a user; (2) collect image data from a front facing camera in communication with, or mounted on, the computing or mobile device of the user; (3) determine that zero people are viewing the display screen or that two or more people are viewing the display screen for more than a threshold duration of at least one second from computer analysis of the collected image data; and/or (4) blur or obscure the confidential or sensitive information being displayed on the display screen when it is determined that the zero people are viewing the display screen or that the two or more people are viewing the display screen for more than the threshold duration to facilitate protecting confidential or sensitive information from eavesdroppers. The computing or mobile device may include additional, fewer, or alternate actions, including those discussed elsewhere herein.

In yet another aspect, a non-transitory computer-readable memory may store instructions thereon. The instructions, when executed by one or more processors, may cause the one or more processors to: (1) determine that confidential or sensitive information is being displayed on a display screen of the computing or mobile device of a user; (2) collect image data from a front facing camera in communication with, or mounted on, the computing or mobile device of the user; (3) determine that zero people are viewing the display screen or that two or more people are viewing the display screen for more than a threshold duration of at least one second from computer analysis of the collected image data; and/or (4) blur or obscure the confidential or sensitive information being displayed on the display screen when it is determined that the zero people are viewing the display screen or that the two or more people are viewing the display screen for more than the threshold duration to facilitate protecting confidential or sensitive information from eavesdroppers. The non-transitory computer-readable memory may include additional, fewer, or alternate instructions, including those discussed elsewhere herein.

Figure 1:
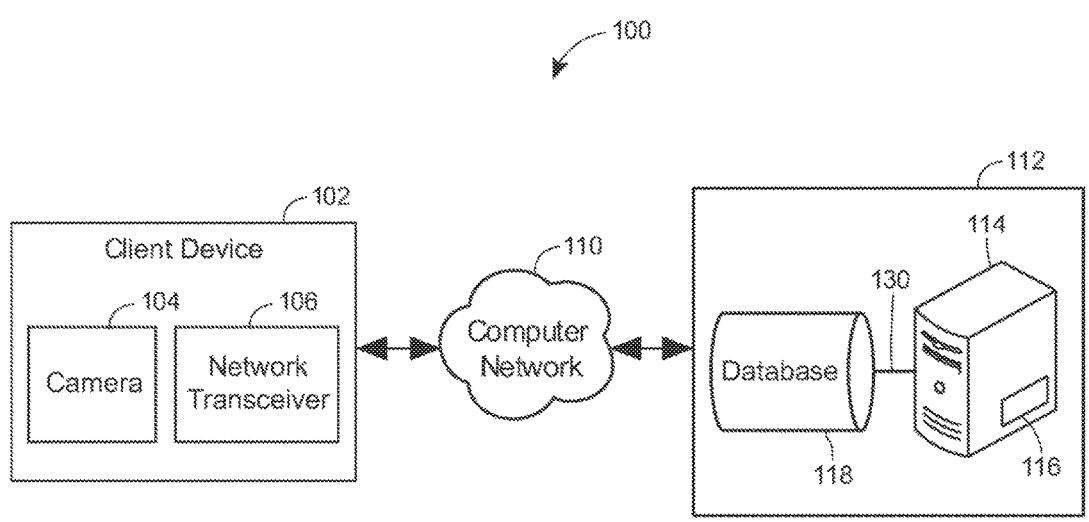
FIG. 1 is a simplified and exemplary block diagram of a system for concealing sensitive data.

The figures depict a preferred embodiment of the present invention for purposes of illustration only. One of ordinary skill in the art will readily recognize from the following discussion that alternative embodiments of the structures and methods illustrated herein may be employed without departing from the principles of the invention described herein.

DETAILED DESCRIPTION

A system and method may relate, inter alia, to concealing sensitive data displayed within a viewport of a display of a client computing device. Sensitive data may include social security numbers, account numbers, passwords, user names, credit card numbers, names, dates, phone numbers, addresses, identification numbers, birth dates, education/training information, salary, financial information, health records, ethnicity, credit rating, birth place, tax return information, citizenship, disability/veteran status, pending lawsuits, worker's compensation claims, age, and/or e-mail address. Sensitive data may also include bank, trading, or financial account information, such as an account balance, account number, transaction history, etc. Sensitive data may further include insurance account information, such as an account number, policy details, transaction history, premiums, discounts, rates, contact information, coverages, deductibles, vehicle information, VINs (Vehicle Identification Numbers), beneficiaries or family members, etc. In some aspects, sensitive data may not be limited to text-based information, and/or may also include images, videos, audio, etc.

In one aspect, the present embodiments may utilize a camera (and/or one or more other sensors), such as a front facing camera of a computing device, and/or one or more biometric recognition techniques (or sensors) to determine if someone other than the user of the computing device is looking at the display of the client computing device. A biometric detection service, application, and/or functionality may be initiated upon detection that sensitive user data is being displayed within a viewport of the display of the computing device. Exemplary biometric recognition techniques may include facial recognition, eye recognition, etc. If the biometric service, application, and/or functionality detects a second biometric identifier, such as a biometric identifier belonging to someone other than the user, the sensitive user data displayed within the viewport of the computing device may be obscured, blurred, or masked. The biometric detection service, application, and/or functionality (or related computer-implemented instructions) may be terminated when sensitive data is no longer displayed. In this manner, the biometric service, application, and/or functionality may detect the primary user, and may obscure confidential and/or sensitive data upon detecting another pair of eyes and/or face viewing the display of the computing device, but may also preserve battery life when sensitive data is no longer displayed.

As an example, a user may be sitting at a crowded airport while checking bank account information. A second person may stand behind the user and be able to see the display of the computing device. Upon detecting that sensitive data is displayed within the viewport of the computing device, the biometric recognition service, application, and/or functionality may be initialized. Upon detecting that the second person is viewing the display of the computing device, the sensitive user data may be blurred or masked.

By blurring or masking sensitive user data upon detecting that the second person is viewing the display, the present embodiments advantageously may enhance electronic data security. Moreover, the present embodiments may reduce the risk that an eavesdropper has access to a user's sensitive data, thereby decreasing the number of occurrences of identity theft, credit card fraud, etc.

In one aspect, the present embodiments may further include capturing a digital image using the camera of the computing device upon detecting that someone other than the user is viewing the display. The digital image may be captured and/or displayed in real-time or at least near real time and may be a still image or video. The digital image may also include the sensitive data displayed within the viewport of the display at the time of detection.

The present embodiments may provide one or more methods for determining sensitive data. In one aspect, certain data items may be flagged as confidential, sensitive, etc. The data items may be flagged by a user, a programmer of an application, etc. In one aspect, a server may send a notification to the computing device indicating that sensitive data is displayed.

In one aspect, the computing device may be associated with more than one user. One or more biometric "fingerprints" may be created and used to identify each user. Upon detecting that a new user is using the device, user credentials may be requested to further authenticate the second user.

I. Exemplary Concealing of Sensitive Data

In one aspect, a system and method may be provided that display and obscure sensitive data. The present embodiments may include recognizing when sensitive data is displayed within a viewport of a display of a computing device; starting a biometric detection service, application, and/or functionality; and/or detecting a first biometric identifier belonging to the user of the computing device. Furthermore, some embodiments may detect a second biometric identifier belonging to someone other than the user of the computing device. Some embodiments may also obscure the sensitive data displayed within the viewport of the computing device upon detecting the second biometric identifier. In some aspects, the system and method may also capture a digital image upon detection of the second biometric indicator, and/or include the sensitive data displayed within the viewport of the computing device in the digital image. In some aspects, the biometric detection service may be ended when sensitive data is no longer displayed within the viewport of the display.

The present embodiments may also provide one or more techniques to classify certain data as "sensitive." For example, in some aspects a programmer of an application may classify certain portions of the application (such as data fields, specific data, certain tabs, or other areas, etc.) as sensitive data. In addition to the programmer defined sensitive data, the system and method may also allow a user of the application to classify data as sensitive. For example, the system and method may allow the user to select certain data, data fields or other portions of an application and designate data displayed in those portions as "sensitive data."

The system and method may still further associate one or more users with an account and/or computing device. For example a "biometric fingerprint" may be registered for a user authorized to access sensitive data. The system and method may detect a biometric identifier and compare the biometric identifier to the biometric fingerprint to allow the user to view the sensitive data. In some aspects, a "biometric fingerprint" may be registered for an unauthorized user. Accordingly, if a biometric identifier is matched to the unauthorized biometric fingerprint, any sensitive data displayed within the viewport of the display may be obscured.

II. Exemplary System Architecture

FIG. 1 illustrates various aspects of an exemplary architecture for concealing sensitive data on a computing device 100. The high-level architecture includes both hardware and software applications, as well as various data communications channels for communicating data between the various hardware and software components. The system for receiving sensitive data on the computing device 100 may include various software and hardware components or modules that may employ one or more methods described herein. The various modules may be implemented as computer-readable storage memories containing computer-readable instructions (i.e., software) for execution by a processor of the system for concealing sensitive data on the computing device 100.

A. Exemplary Front End Components

The system for concealing sensitive data on the computing device 100 may include front end components, including a computing device 102 that may execute instructions for executing an application, displaying sensitive user data, etc. The computing device 102 may be a personal computer, smart phone, tablet computer, notebook, netbook, laptop, phablet, smart watch, wearable electronics, or other suitable computing device or mobile device. In some aspects, the computing device need not be portable, as it is envisioned that the techniques described herein may be used with an automated teller machine (ATM), desktop computers in public places, etc. Those of ordinary skill in the art will recognize that the present system may be used in a dedicated application, a web application, a combination thereof, etc.

The computing device 102 may also include one or more cameras 104, such as a front facing camera, rear facing camera, a combination thereof, sensors, etc.

In some aspects, the computing device 102 may include a network transceiver 106 for connecting to a computer network 110, such as the Internet or other type of suitable network (e.g., local area network (LAN), a metropolitan area network (MAN), a wide area network (WAN), a mobile, a wired or wireless network, a private network, a virtual private network, etc.). The computing device 102 may connect to back end components 112 via the computer network 110, such as via wired or wireless communication, including radio frequency (RF) communication.

While the example system 100 includes one computing device 102, any number of computing devices may be included in the example system 100 such that two or more computing devices may communicate with each other to conceal sensitive data. For example, a first computing device, such as a user's smart phone may capture a digital image of a potential eavesdropper upon detection of the second biometric identifier. The first computing device may communicate with a second computing device, such as a user's smart watch or other wearable device to display the captured digital image on the user's smart watch.

In some embodiments, the first and second computing devices may communicate with each other over a short range communication network, such as Bluetooth, Wi-Fi Direct, wired or wireless Universal Serial Bus (USB), Near Field Communication (NFC), ZigBee, LAN, or any other suitable short range communication network. In this manner, the smart watch may act as a rear-view mirror for the user, and the user may see the other person(s), looking at the screen. In other embodiments, the first computing device may display the captured digital image on a portion of the user interface of the first computing device, such as the upper right, upper left, lower right, or lower left corner of the user interface.

B. Exemplary Back End Components

The back end components 112 may include a server 114 that may include one or more computer-executable instructions 116 for determining when sensitive data is being accessed, transmitted, displayed, etc. The back end components 112 may further include one or more databases 118. Each database 118 may include a data storage device, such as random-access memory (RAM), hard disk drive (HDD), flash memory, flash memory such as a solid state drive (SSD), etc. The back end components may communicate with each other through a communication network 120, such as a local area network or other type of suitable network (e.g., the Internet, a metropolitan area network (MAN), a wide area network (WAN), a mobile, a wired or wireless network, a private network, a virtual private network, etc.).

The exemplary system 100 shown in FIG. 1 may include additional, fewer, or alternate components, including those discussed elsewhere herein.

III. Exemplary Flow Chart for Displaying and Concealing Sensitive Data

Figure 2:
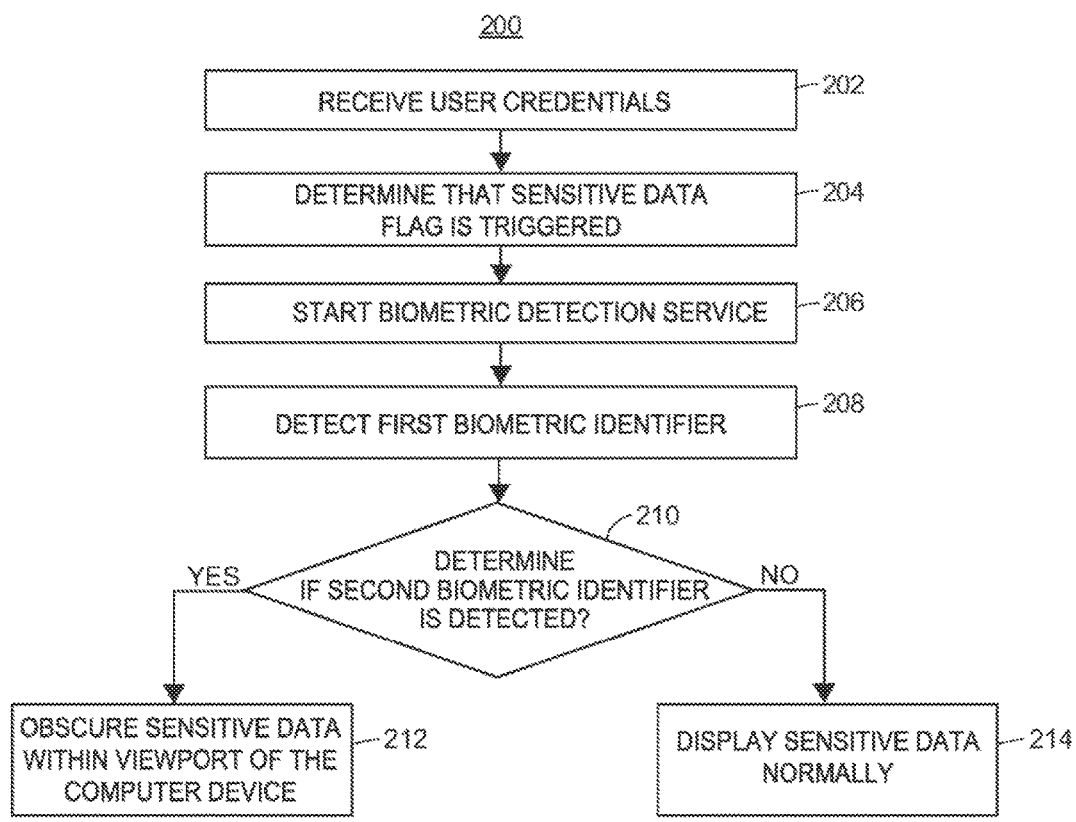
FIG. 2 is a flow chart illustrating an exemplary method for displaying and concealing sensitive data.

FIG. 2 is a high level flow chart of an exemplary method, routine or process 200 for concealing sensitive data on a computing device. A user, such a customer of an insurance company, a customer of a banking company, a holder of an insurance policy and/or bank account, a beneficiary of an insurance policy and/or bank account, a claimant, an insurance agent associated with the company or some other employee or independent contractor affiliated with the company, may use a client device, such as the computing device 102 illustrated in FIG. 1, to access a program that accesses sensitive data. For example, the program may be for banking, finance, insurance, etc. The company program may be a native application, a web application hosted on one or more servers, such as the server 114, described in reference to FIG. 1, a combination of the two, etc.

The user may enter an input, via a mouse click, touch press, keyboard click, etc., representing one or more user credentials and the one or more user credentials may be received at the computing device (block 202). For example, the user credentials may be a customer name associated with a company account, a user name of the customer account, etc. In some embodiments, the user may be a customer entering a user account credential. In some embodiments, one or more processors of the computing device may also execute an instruction to verify the customer account credentials via the use of a password or other verification technique. The computing device may further transmit the received customer account identification and/or verification information to a second computing device, such as an authentication server, for authentication.

Once a user has logged into the application, a processor of the computing device may execute an instruction to determine if a sensitive data flag has been triggered (block 204). Generally speaking, the sensitive data flag indicates that sensitive user data is being, or about to be, displayed within a viewport of the display of the computing device. For example, the user may have requested an account balance, transaction number, contact information, etc.

There are numerous examples of how the sensitive data flag may be triggered. In some aspects, the sensitive data flag may be triggered when the processor determines that sensitive data is being, or about to be, displayed within a viewport of a display of the computing device. In some aspects, the sensitive data flag may be triggered when the processor determines that a user has accessed a sensitive data portion of an application, such as a transaction history tab or policy details portion. A portion of an application (or functionality) may be defined as sensitive by someone creating the application (or functionality), may be specified by the user, etc. In still further aspects, the processor of the computing device may receive an indication that the sensitive data flag has been triggered. The indication may originate from a second computing device, such as a third party server, company server, etc. For example, a user using a web application may enter a user input selecting an account information tab and the request may be sent from the computing device to a remotely located company server, such as the server 114 described in reference to FIG. 1. The company server may determine that the user has requested sensitive information, and/or transmit an indication to the computing device that sensitive data has been accessed and/or requested, and will be displayed within a viewport of the display of the computing device.

The processor may further execute an instruction to initiate a biometric detection service or functionality (block 206). In some embodiments, the processor may execute the instruction to initiate the biometric detection service or functionality in response to detecting that sensitive data is being, or about to be, displayed within the viewport of the display of the computing device. The processor may also execute an instruction to detect a first biometric identifier belonging to the user of the computing device (block 208). For example, the processor may execute an instruction to utilize one or more of the cameras (or other sensors) of the computing device (such as the camera 108 described in reference to FIG. 1) and one or more biometric identification techniques to identify the user. Exemplary biometric identifiers may include facial recognition, eye recognition, etc. Numerous biometric identification techniques are known in the art, and those of ordinary skill in the art will recognize that any combination of these techniques may be used to identify the user. In some embodiments, a biometric fingerprint for the user may already be preregistered, and associated with the user account and/or computing device. Creating and using digital biometric fingerprints is discussed in further detail below, in reference to FIGS. 4 and 5.

Once the user has been identified, the biometric identification service, application, or functionality may be used to determine if an eavesdropper or someone other than the user of the computing device is looking at the display of the computer device. The processor may further execute an instruction to detect a biometric identifier identifying the non-user of the computing device (block 210). For example, a processor executing the biometric detection service may utilize the front facing camera of the computing device to determine if a second person is standing behind the primary user of the computing device. If the processor executing the instruction determines that a second biometric identifier is detected, (YES branch of block 210), the processor may further execute an instruction to obscure the sensitive data within the viewport of the display of the computing device (block 212). For example, the sensitive data may be obscured by blurring, or otherwise masking, the appearance of the sensitive data, blacking it out, no longer displaying the sensitive data, etc.

In some aspects, the processor may further execute an instruction to determine if the non-user of the computing device is looking at the display of the computing device. If the processor executing the instruction determines that a second biometric identifier is not detected, (NO branch of block 208), the processor may further execute an instruction to display the sensitive data within the viewport of the display of the computing device (block 214). Accordingly, the sensitive data may only be obscured if the non-user is looking at the display of the computing device. The exemplary method 200 may include additional, fewer, or alternate actions, including those discussed elsewhere herein.

In some aspects, the processor may further execute an instruction to capture a digital image upon detecting the second biometric identifier. The digital image may be captured using, for example, the front facing camera of the computing device. The digital image may further include the sensitive data displayed within a viewport of the display of the computing device at the time of detecting the second biometric identifier. In this manner, the user of the computing device may see what sensitive data may have been viewed by the non-user and take appropriate precautions.

In some aspects, the processor may further execute an instruction to determine when the sensitive data flag is no longer triggered and/or sensitive data is no longer displayed within the viewport of the display of the computing device. In response, the processor may end the biometric detection service, application, or functionality from running or executing, either locally or remotely. In some aspects, the computing device may receive an indication from a second computing device, such as the server 114 described in reference to FIG. 1, that the sensitive data flag is no longer triggered.

Also in some aspects, the processor may execute an instruction to determine that no one is looking at the display of the computing device. For example, the processor may execute an instruction to utilize one or more of the cameras (or other sensors) of the computing device (such as the camera 108 described in reference to FIG. 1) and one or more biometric identification techniques to identify that no one is looking at the display. If no one is looking at the display, the processor may execute an instruction to obscure the sensitive data within the viewport of the display of the computing device. For example, the sensitive data may be obscured by blurring, or otherwise masking, the appearance of the sensitive data, blacking it out, no longer displaying the sensitive data, etc.

IV. Exemplary User Interface and Related Functionality

Figure 3A:
FIG. 3A is an exemplary sensitive data application displaying sensitive user data within a viewport of a display of a computing device.

In one aspect, a user interface for viewing and concealing sensitive user data may be provided. FIG. 3A illustrates an exemplary viewport of a display of a computing device executing an exemplary sensitive data application 300. The sensitive data application 300 may include graphically depicting and/or visually presenting various types of data within the viewport of the display, such as sensitive data items and non-sensitive data items. The sensitive data application 300 may include graphically depicting and/or visually presenting other types of data as well. The unified product page may include additional, less, or alternate functionality, including functionality discussed elsewhere herein.

The user interface may provide or facilitate the input, and/or viewing, of many features of the system and method for concealing sensitive data discussed herein. A number of the exemplary user interface features and functionalities are discussed below.

A. Exemplary Displaying Sensitive Data Functionality

The exemplary sensitive data application 300 illustrated in FIG. 3A is an insurance company application for viewing data items concerning an insurance policy. However, it will be recognized that techniques described herein may be applicable to other types of sensitive data application. As illustrated in FIG. 3A, the sensitive data application 300 may display data items for an insurance policy including the insured party's name, a policy number, a year, make model and VIN of a vehicle, an insurance agent, a contract phone number, the effective dates of the policy, and/or details concerning the specific coverage, premium, rates, discounts, and/or deductibles of the insurance policy. One or more of these data items may be classified as sensitive data items 302. For example, a developer of the application may flag certain data items, such as VIN number and policy as sensitive, and/or a user of the application or functionality may select one or more types of data items, such as insured party and phone number, to be sensitive, etc. Of course, these are only examples, and any combination of data items may be classified as sensitive.

In any case, as described above, a processor may execute an instruction to determine if any sensitive data is being, or about to be, displayed within a viewport of a display of the computing device. Upon determining that sensitive data is being, or about to be, displayed within a viewport of the display, the processor may execute an instruction to initiate a biometric detection service, application, or functionality, and/or detect a biometric identifier identifying the user of the computing device. The processor may further detect a biometric identifier identifying a second person within the range of the camera of the computing device, and/or execute an instruction to obscure the sensitive data within the viewport of the display of the computing device.

B. Exemplary Obscuring Sensitive Data Functionality

Figure 3B:
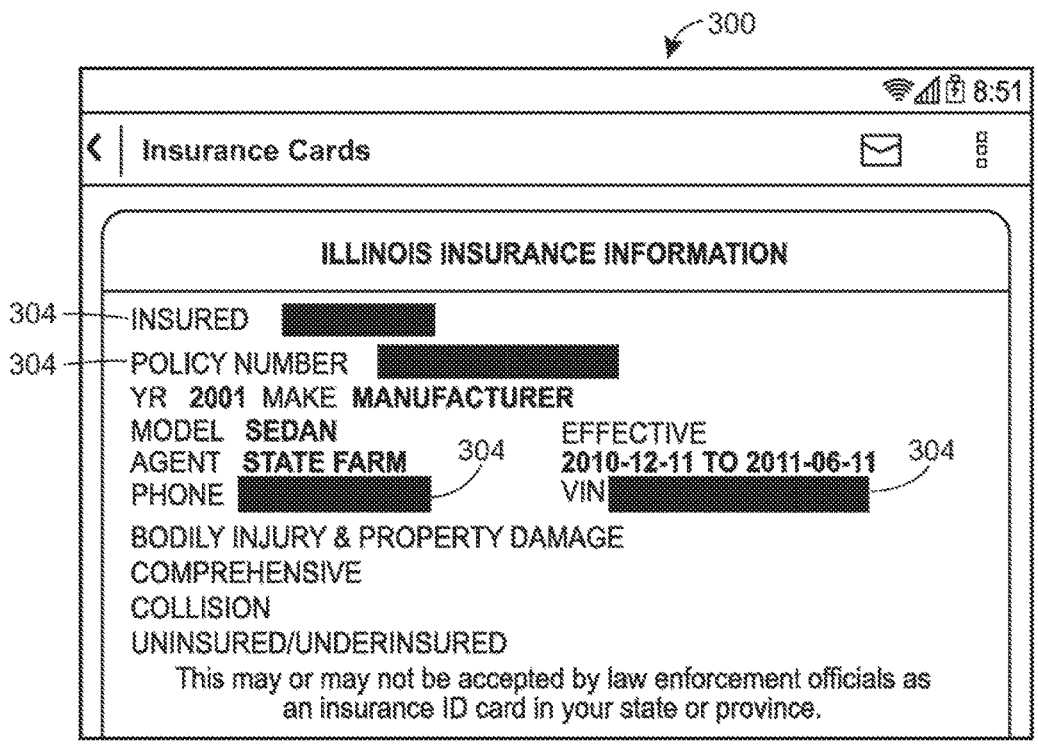
FIG. 3B is an exemplary sensitive data application obscuring sensitive user data displayed within a viewport of a display of a computing device.

Turning now to FIG. 3B, several sensitive obscured data items 304 may be displayed within the exemplary sensitive data application 300. In the exemplary sensitive data application 300 depicted in FIG. 3B, sensitive data categories may include policy number, insured party, phone number and VIN. Although FIG. 3B illustrates the obscured data items 304 as "blurred" data, those of ordinary skill in the art will appreciate that other techniques to obscure data may be used.

Numerous techniques may be used to determine what data categories are considered "sensitive." For example, certain data fields may be classified as "sensitive" by the developer of the application. In some aspects, a user may have the ability to classify certain data items as "sensitive." The user may make use an input device, such as a touch screen, keyboard, mouse, to identify certain data categories to be classified as "sensitive." In one example, the user may long press or touch a certain data field to indicate that the data displayed in the data field is sensitive data.

V. Exemplary Flow Chart for Creating a Biometric Fingerprint Associated with a User In some aspects, it may be beneficial to create one or more "biometric fingerprints" defining one or more biometric identifiers for each authorized user of the user account. For example, the biometric fingerprint may define a user's face, eye or eyes, hair color, hair style, facial features, teeth or jaw structure, nose, ears, etc. When attempting to access sensitive data, the biometric detection service, application, or functionality may detect a biometric identifier belonging to the current user of the computing device, and then compare the biometric identifier of the current user to the biometric fingerprint of authorized users. If the biometric identifier of the current user matches a biometric fingerprint belonging to an authorized user, sensitive data may be displayed on the screen.

Figure 4:
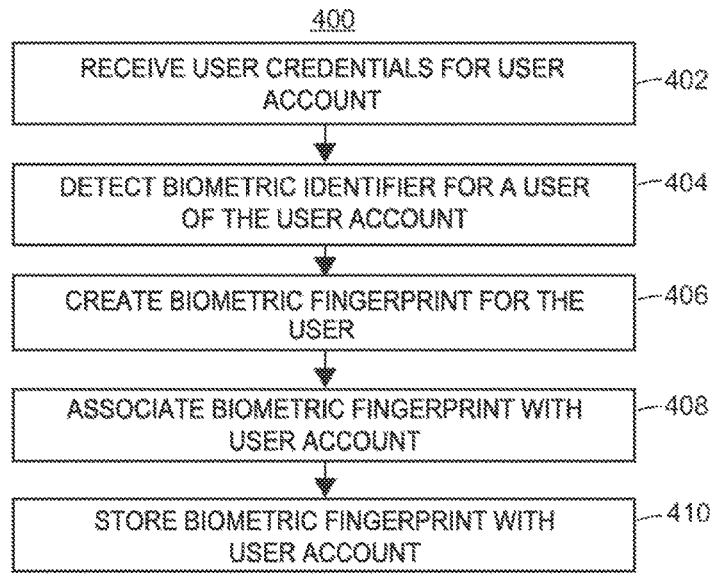
FIG. 4 is a flow chart illustrating an exemplary method for creating a biometric fingerprint associated with a user.

FIG. 4 is a high level flow chart of an exemplary method, routine or process 400 for creating a biometric fingerprint associated with a user. A user, such as a customer of the company, a holder of an insurance policy of the company, etc., may use a client device, such as the computing device 102 illustrated in FIG. 1 to access a company program. The company program may be a native application, a web application, a combination of the two, etc. and/or include or provide the functionality discussed herein. The company program and/or the functionality described herein may be locally or remotely stored, such as stored locally on the computing or mobile device 102 or stored remotely on a remote server or processor 112.

The processor of the server may receive one or more user credentials for a user account (block 402). For example, the user credentials may include a user name and password, etc. The processor may also execute an instruction to detect a biometric identifier for a user of the user account (block 404). For example, the processor may execute an instruction to use a camera device (such as the camera device 104 illustrated in FIG. 1) to create one or more biometric fingerprints for the user of the user account (block 406) and associate the biometric fingerprint with the user account (block 408). For example, the biometric identifier may be saved with the user account credentials, and/or associated with the user account. The processor may further execute an instruction to store the biometric fingerprint (block 410), such as in a memory unit. The method may include additional, fewer, or alternate actions, including those discussed elsewhere herein.

Figure 5:
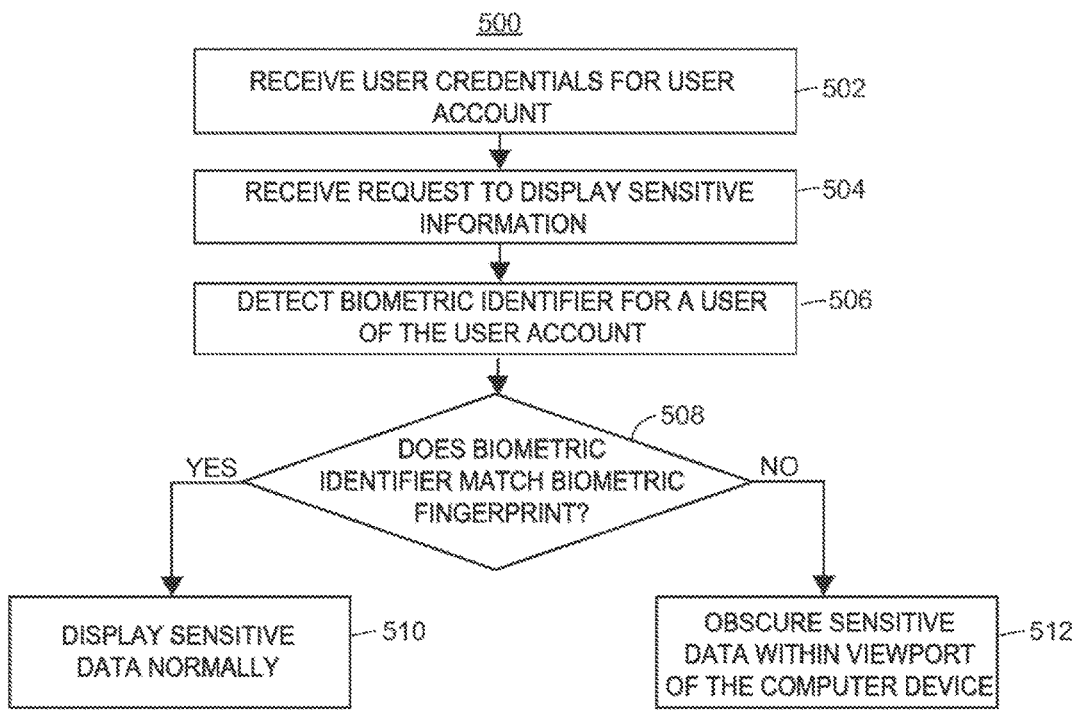
FIG. 5 is a flow chart illustrating an exemplary method for defining a data category as sensitive.

VI. Exemplary Flow Chart for Matching a Biometric Fingerprint Associated with a User FIG. 5 is a high level flow chart of an exemplary method, routine or process 500 for creating a biometric fingerprint associated with a user. The user may enter an input, via a mouse click, touch press, keyboard click, two or three dimensional gesture recognition, voice commands, etc., representing one or more user credentials, and the one or more user credentials may be received at the computing device (block 502). The processor may further receive a request to display sensitive data on a display of a computing device (block 504). As described above, this request may be a variety of things. For example, the user may have requested an account balance, transaction number, contact information, etc. In some embodiments, the processor executing the instructions may alternatively or additionally determine that a user has accessed a sensitive data portion of an application, such as a transaction history or policy details portion, and/or determine that sensitive data is about to be, or currently being, displayed within the viewport of the display of the computing device. In some aspects, the processor may also execute an instruction to initiate a biometric detection service, application, or functionality in response to detecting that sensitive data is about to be, or currently being, displayed within the viewport of the display of the computing device The processor may also execute an instruction to detect a first biometric identifier for a user of the computing device (block 506). For example, the processor may execute an instruction to utilize one or more of the cameras of the computing device (such as the camera 104 described in reference to FIG. 1) and one or more biometric identification techniques or functionalities to identify the user. Example biometric identifiers may include facial recognition, eye recognition, facial structure recognition, ear or nose recognition, hair or teeth recognition, etc. Numerous biometric identification techniques are known in the art, and those of ordinary skill in the art will recognize that any combination of these techniques may be used to identify the user. The processor may further execute an instruction to determine if the detected biometric identifier matches one or more biometric fingerprints associated with the user account (block 508). For example, a biometric fingerprint may be created using the method 400 described in reference to FIG. 4.

If the processor executing the instruction determines that the biometric identifier matches one of the biometric fingerprints associated with the user account (YES branch of block 508), the processor may execute an instruction to normally display (i.e., display without concealing) the sensitive data within the viewport of the display of the computing device (block 5010). Conversely, if the processor executing the instruction determines that the biometric identifier does not match any biometric fingerprints associated with the user account (NO branch of block 508), the processor may execute an instruction to obscure or blur sensitive data displayed within the viewport of the display of the computing device (block 512).

In some aspects, the processor executing the instruction(s) may determine that the biometric identifier matches an authorized user, but not the user tied to the received account credentials. Accordingly, the processor may further execute an instruction to request a second user credential authenticating the authorized user.

In addition to creating and matching biometric fingerprints for authorized users of the account, the techniques described herein may also be used to prevent unauthorized users from accessing sensitive data. In some aspects, a digital fingerprint for an unauthorized user may be created from, for example, an image of an unauthorized user. For example, a woman may have an ex-husband who she previously shared sensitive account data with. Although the woman may changer her password, it is possible that the ex-husband can guess the new password. The woman may use the method described herein to submit an image of the ex-husband's face to an unauthorized user list. Accordingly, when a user attempts to view sensitive data, the biometric detection service, application, and/or functionality may detect the biometric identifier of the user, and/or compare it to the biometric identifiers on the unauthorized user list. If the biometric identifier matches a biometric identifier belonging to a user on the unauthorized user list, then any sensitive data being, or about to be, displayed on the display of the computing device may be obscured. The method may include additional, fewer, or alternate actions, including those discussed elsewhere herein.

VII. Exemplary Computing Device

Figure 6:
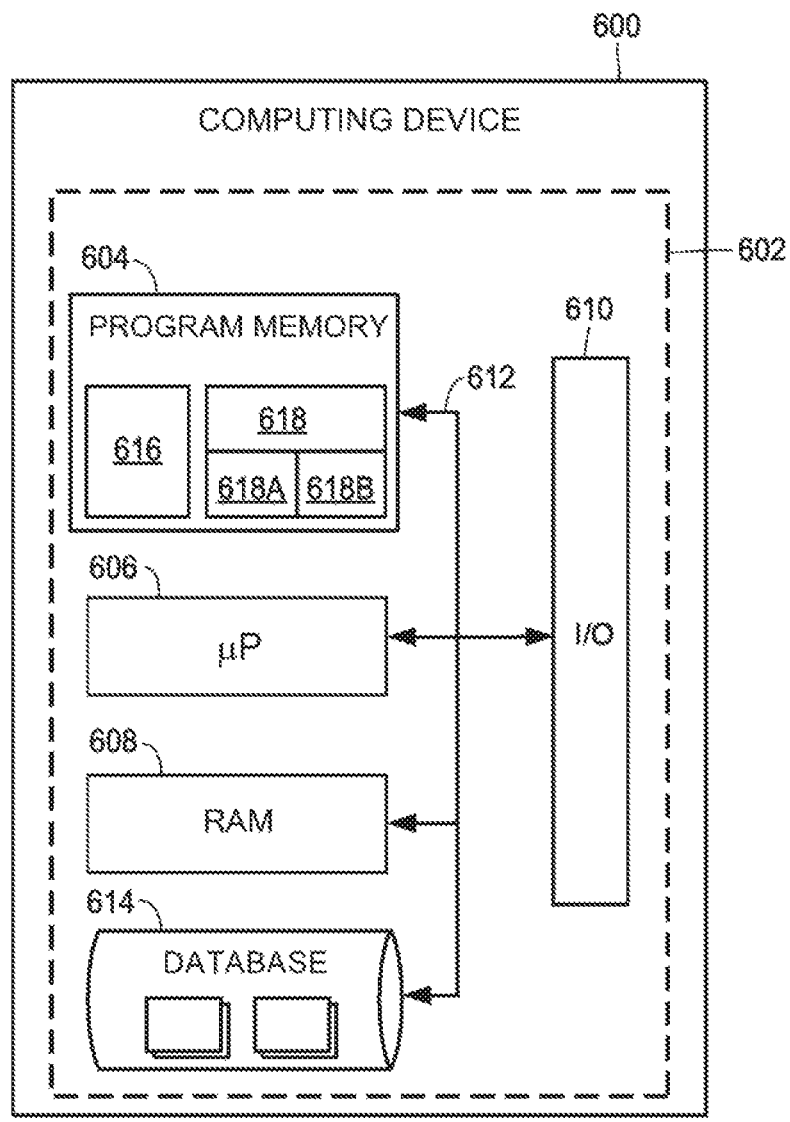
FIG. 6 is an exemplary architecture of a computing device.

Referring now to FIG. 6, a computing device 600 may include a controller 602. Exemplary computing device may include the client device 102 and/or the server 114 illustrated in FIG. 1. The controller 602 may include a program memory 604, a microcontroller or a microprocessor (μP) 606, a random-access memory (RAM) 608, and an input/output (I/O) circuit 610, all of which may be interconnected via an address/data bus 612. The program memory 604 may store computer-executable instructions, which may be executed by the microprocessor 606. In some embodiments, the controller 602 may also include, or otherwise be communicatively connected to, a database 614 or other data storage mechanism (e.g., one or more hard disk drives, optical storage drives, solid state storage devices, etc.). It should be appreciated that although FIG. 6 depicts only one microprocessor 606, the controller 602 may include multiple microprocessors 606. Similarly, the memory 604 of the controller 602 may include multiple RAMs 616 and multiple program memories 618, 618A and 618B storing one or more corresponding application modules, according to the controller's particular configuration. The computing device 600 may also include specific routines to be performed by the computing device 600.

Although FIG. 6 depicts the I/O circuit 610 as a single block, the I/O circuit 610 may include a number of different types of I/O circuits (not depicted). The RAM(s) 608, 604 and the program memories 618, 618A and/or 618B may be implemented in a known form of computer storage media, including but not limited to, semiconductor memories, magnetically readable memories, and/or optically readable memories, for example, but does not include transitory media such as carrier waves.

VIII. Exemplary Concealing of Sensitive Data

In one aspect, a computer-implemented method of dynamically concealing sensitive data displayed in associated applications to a user may be provided. The method may include (1) displaying a visual, textual, or graphical representation of a first application on a display screen and/or user interface; (2) displaying a visual, textual, or graphical representation of a first set of data items on the display screen, wherein one or more of the data items may be classified as sensitive data items; and/or (3) concealing the visual, textual, or graphical representation of the sensitive data items on the display screen and/or user interface, the sensitive data items being concealed by a blurring or other suitable technique. The concealing of sensitive data displayed within the viewport of the display of the computing device may prevent unwanted third parties, or eavesdroppers, from viewing the sensitive data displayed. The method may also allow the user to capture a digital image of the onlooker, as well as the sensitive data displayed at the time.

Noted above, the method may include concealing sensitive data displayed within a viewport of a display of a client device. Sensitive data may include social security numbers, passwords, user names, credit card numbers, names, dates, phone numbers, addresses, identification numbers, birth dates, education/training information, salary, financial information, health records, ethnicity, credit rating, birth place, tax return information, citizenship, disability/veteran status, pending lawsuits, worker's compensation claims, age, and/or e-mail address. Sensitive data may also include bank or financial account information, such as an account balance, account number, transaction history, etc. Sensitive data may further include insurance account information, such as an account number, policy details, transaction history, premiums, contact information, vehicle information, VIN numbers, etc. In some aspects, sensitive data may not be limited to text-based information, and/or may also include images, videos, audio, etc.

The method may include displaying or presenting information regarding specific insurance agents or other sales representatives. For instance, agent name, contact information, and/or agent website information may be provided. Other types of customer assistance may be provided.

IX. Exemplary Method Embodiments

In one aspect, a computer-implemented method of sensitive information security may be provided. The method may include (1) determining, by one or more processors, that confidential or sensitive information is about to be, or is currently being, displayed on a display screen or other display of, or associated with, a mobile or other computing device of a user; (2) collecting, by the one or more processors, image data from a front facing camera mounted on, or associated with, the mobile or other computing device of the user; (3) determining, by the one or more processors, that a potential eavesdropper or unauthorized user is viewing the display screen or other display from computer analysis of the image data collected; (4) blurring or obscuring, by the one or more processors, the confidential or sensitive information being displayed on the display screen or other display when it is determined that the potential eavesdropper or unauthorized user is viewing the display screen or other display; and/or (5) generating, by the one or more processors, a warning to the user indicating a presence of the potential eavesdropper or unauthorized user when (a) it is determined that the potential eavesdropper or unauthorized user is viewing the display screen or other display, and (b) confidential or sensitive information is about to be displayed, or is being displayed, on the display screen or other display to facilitate maintaining sensitive information secure. The method may include additional, fewer, or alternate actions, including those discussed elsewhere herein.

For instance, determining, by the one or more processors, that the potential eavesdropper or unauthorized user is viewing the display screen or other display from computer analysis of the image data collected may be accomplished by the one or more processors (i) determining that two people (or two sets of eyes) are currently looking at the display screen or other display, and/or (ii) determining that one of the people is not an owner or authorized user of the mobile or other computing device. Additionally or alternatively, determining, by the one or more processors, that the potential eavesdropper or unauthorized user is viewing the display screen or other display from computer analysis of the image data collected may be accomplished by the one or more processors (i) determining that two sets of human eyes are currently looking at the display screen or other display, and/or (ii) determining that one of the sets of eyes do not belong to an owner or authorized user of the mobile or other computing device.

Further, determining, by the one or more processors, that the potential eavesdropper or unauthorized user is viewing the display screen or other display from computer analysis of the image data collected may be accomplished by the one or more processors (i) determining that two people are currently looking at the display screen or other display, and/or (ii) determining that one of the people is not an owner or authorized user of the mobile or other computing device by using facial recognition or eye recognition software. Also, determining, by the one or more processors, that the potential eavesdropper or unauthorized user is viewing the display screen or other display from computer analysis of the image data collected may be accomplished by the one or more processors determining that a person currently looking at the display screen or other display is not an owner or authorized user of the mobile or other computing device by using facial recognition techniques on the image data.

Additionally or alternatively, determining, by the one or more processors, that the potential eavesdropper or unauthorized user is viewing the display screen or other display from computer analysis of the image data collected may be accomplished by the one or more processors determining that a person currently looking at the display screen or other display is not an owner or authorized user of the mobile or other computing device by using eye recognition techniques on the image data.

In one aspect, the mobile or other computing device may only look for an eavesdropper when confidential or sensitive information is being displayed. As a result, battery power of the mobile or other computing device may be saved.

In another aspect, the mobile or other computing device may only look for an eavesdropper when the user travels to a website or webpage with a large amount of data or content that is, or may include confidential or sensitive information. For instance, when the user travels to a website of their bank, stock or futures broker, or insurance provider, the mobile or other computing device may look for eavesdroppers, and if one is detected, such as by using the techniques disclosed herein, a warning may be issued to the user and/or any confidential or sensitive may be blurred or otherwise obscured when displayed.

X. Exemplary Non-Transitory Media

In another embodiment, a computer readable storage medium comprising non-transitory computer readable instructions stored thereon for concealing sensitive personal data being, or about to be, displayed within a viewport of a display of a computing device may be provided. The instructions when executed on one or more processors, may cause the one or more processors to: (1) determine that a sensitive data flag has been triggered, wherein the sensitive data flag indicates that sensitive user data is being, or about to be, displayed within a viewport of the computing device; (2) initiate a biometric detection service in response to determining that the sensitive data flag has been triggered, (3) detect a first biometric identifier belonging to the user of the computing device; (4) detect a second biometric identifier belonging to an eavesdropper, potential eavesdropper, or someone other than the user of the computing device; and/or (5) obscure the sensitive user data displayed within the viewport of the computing device. The instructions may further cause the one or more processors to: receive an indication that the sensitive data flag has been triggered, wherein the indication originates from a second computing device. The instructions may further cause the one or more processors to: create a biometric fingerprint for the user of the computing device; and determine that the first biometric identifier matches the biometric fingerprint. The instructions may further cause the one or more processors to: cause a camera to capture a digital image upon detection of the second biometric indicator and including the sensitive data being, or about to be, displayed within the viewport of the computing device in the digital image. The instructions may further cause the one or more processors to: receive a user selection defining one or more sensitive user data categories; and/or determine that the second biometric identifier matches a biometric fingerprint of an unauthorized user. The computer readable storage medium comprising non-transitory computer readable instructions may direct the one or more processors to perform additional, less, or alternate functionality, including that discussed elsewhere herein.

XI. Exemplary Method of Enhancing Data Security

Figure 7:
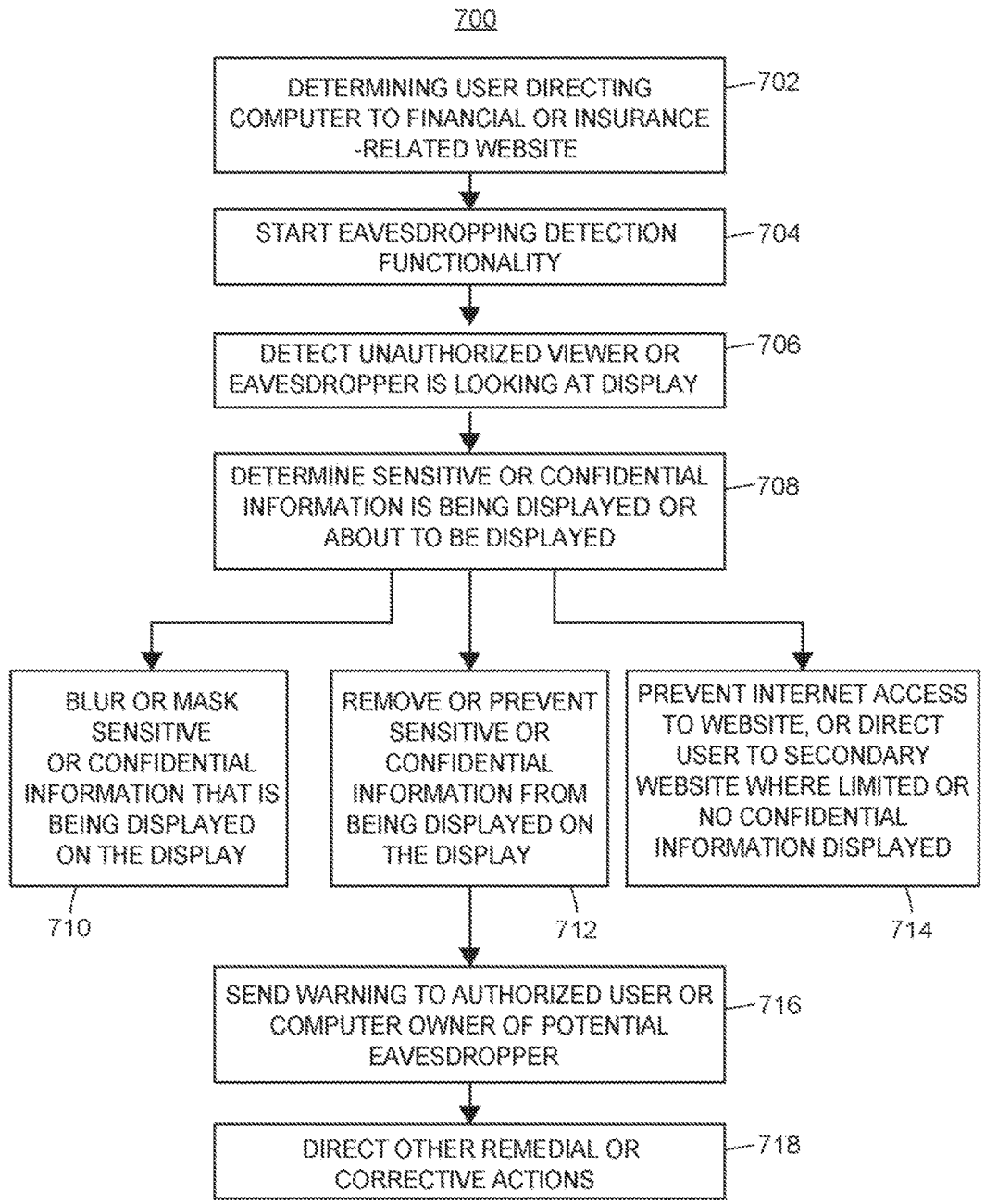
FIG. 7 is a flow chart illustrating an exemplary method for enhancing data security.

FIG. 7 illustrates an exemplary computer-implemented method of enhancing data security 700. The method 700 may include determining that a user is directing a computing device to wirelessly or virtually visit a financial or insurance-related website 702; starting an eavesdropping detection functionality or application 704; detecting an unauthorized viewer or eavesdropper is looking at a display 706; determining that sensitive or confidential information is being displayed, or about to be displayed, on the display 708; blurring or masking (any and/or only) sensitive or confidential information that is being displayed on the display 710; removing or preventing only the sensitive or confidential information from being displayed on the display 712; preventing internet access to the website, and/or directing the user to a secondary website where limited or no confidential information is allowed to be displayed 714; sending a warning to the authorized user or computer owner of the potential eavesdropper 716; and/or directing other remedial or corrective actions 718. The foregoing functionality may be accomplished via one or more local processors associated with a computing device, one or more remote processors (such as remote processors associated with a financial services and/or insurance provider), an eavesdropping detection application or functionality, and/or any combination thereof. The method may include additional, fewer, or alternate actions, including those discussed elsewhere herein.

The method 700 may include determining that a user is directing a computing device to a financial or insurance-related website 702. When a user activates an internet search engine or directs the computing device to access a website, such as a website associated with a bank, financial or trading account, or insurance provider, that activity may be flagged as a trigger (such as by one or more local or remote processors). Additionally or alternatively, when the computing device accesses or arrives at a landing page associated with a bank, financial services provider, and/or insurance provider, that activity may be flagged as a trigger or triggering event.

The method 700 may include starting an eavesdropping detection functionality or application 704. For instance, the computing device may start the eavesdropping detection functionality or application when a trigger or triggering event is detected or otherwise determined, such those discussed elsewhere herein. The triggering events may include accessing various websites, turning on the computing device or starting various functionality or applications, entering various modes of computing device operation (such as a traveling mode, "not at home" mode, "not at work" mode, or a roaming mode), GPS or other location-based functionality, and/or other triggers.

The method 700 may include detecting an unauthorized viewer or eavesdropper is looking at a display 706, such as discussed elsewhere herein. For instance, the eavesdropping detection functionality or application may direct one or more cameras or other sensors (such as thermal imaging sensors) to gather and collect image data, such as image data containing information of persons looking at, or potentially viewing, a display screen or other display associated with the computing device. If two or more people appear to be viewing or facing the display screen or other display of the computing device for (i) too long a time, or (ii) too much within a given time period, one or more local or remote processors (and/or the eavesdropping detection functionality or application) may determine that an eavesdropper, or potential eavesdropper, is viewing (or potentially viewing) the display screen or other display.

The method 700 may include determining that sensitive or confidential information is being displayed, or about to be displayed, on the display (such as a display screen or other type of display) 708, as discussed elsewhere herein. For instance, one or more local or remote processors (and/or the eavesdropping detection functionality or application) may look for certain fields to be filled in by the user on the display screen, such as fields associated with the words or terms "account number" or "home address." Such information being displayed, or about to be displayed (such as on a webpage associated with an insurance customer or insurance provider, insurance application, and/or request for an insurance quote), may be flagged as sensitive or confidential information and/or information that should be prevented from being displayed and/or be masked if it is to be displayed.

The method 700 may include blurring or masking sensitive or confidential information that is being displayed on the display 710, as discussed elsewhere herein. For instance, one or more local or remote processors (and/or the eavesdropping detection functionality or application) may direct or control the sensitive or confidential information identified (and only the sensitive or confidential information) being blurred or masked once it is displayed, or about to be displayed, on a display screen or other display associated with the computing device.

The method 700 may include removing or preventing sensitive or confidential information from being displayed on the display 712. Additionally or alternatively to blurring or masking information, one or more local or remote processors (and/or the eavesdropping detection functionality or application) may remove sensitive or confidential information (and only the sensitive or confidential information) from being displayed on the display, and/or prevent the sensitive or confidential information from being displayed on the display in the first place (i.e., before it is displayed on the display in the first instance).

The method 700 may include preventing internet access to the website, and/or directing the user to a secondary website where limited or no confidential information is allowed to be displayed 714. For instance, one or more local or remote processors (and/or the eavesdropping detection functionality or application) may determine that the website trying to be accessed by the user, such as a website associated with a bank, financial services provider, and/or insurance provider, may be associated with displaying sensitive or confidential information. As such, the one or more local or remote processors (and/or the eavesdropping detection functionality or application) may prevent the user from accessing that website (such as when an actual or potential eavesdropper is detected).

Additionally or alternatively, the one or more local or remote processors (and/or the eavesdropping detection functionality or application) may direct the user to a secondary website associated with the bank, financial services provider, insurance provider, etc. The secondary (or limited information) website may only display limited or no sensitive or confidential information.

The method 700 may include sending a warning to the authorized user or computer owner of the potential eavesdropper 716. For instance, the one or more local or remote processors (and/or the eavesdropping detection functionality or application) may generate a warning indicating the presence of an actual or potential eavesdropper, and/or that sensitive or confidential information is about to be, or is being, displayed.

The method 700 may include directing other remedial or corrective actions 718. For instance, once it is determined that a potential eavesdropper has been detected, and/or that sensitive or confidential was displayed or about to be displayed (and/or requested to be displayed), the one or more local or remote processors (and/or the eavesdropping detection functionality or application) may limit access to the website, limit changes to account information, limit access to account monies, require a username or password reset, and/or prevent access to other or related websites or accounts until corrective action is taken by the authorized user or owner of the computing device to ensure security of their information and/or accounts.

XII. Another Exemplary Method of Enhancing Data Security

Figure 8:
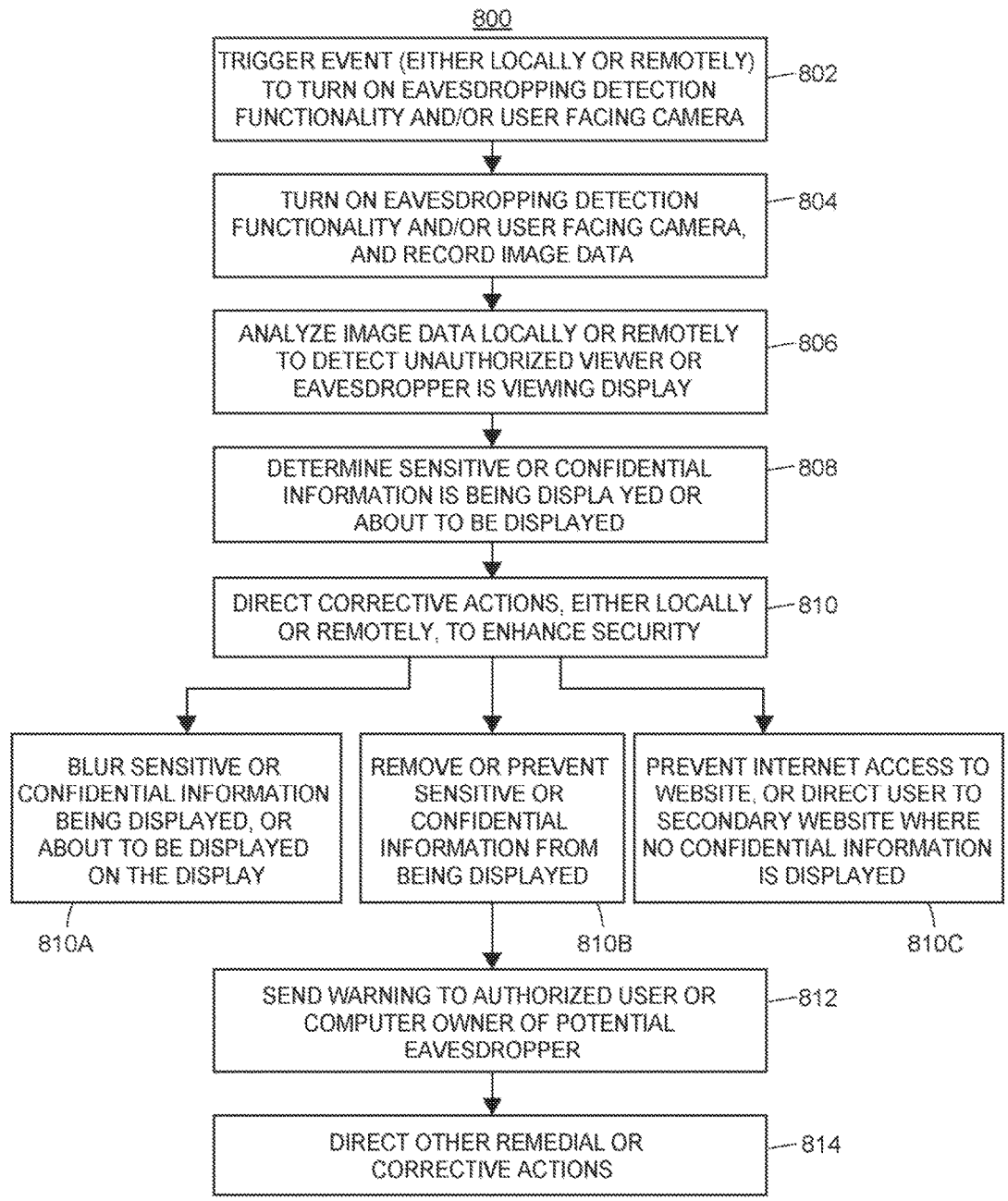
FIG. 8 is a flow chart illustrating an exemplary method of enhancing data or information security.

FIG. 8 illustrates a computer-implemented method of enhancing data or information security 800. The method 800 may include detecting a triggering event (either locally or remotely) to turn on (i) an eavesdropping functionality, and/or (ii) a user-facing camera 802; turning on the eavesdropping functionality and/or user-facing camera, and recording image data 804; analyzing the image data locally and/or remotely to detect an unauthorized viewer or potential eavesdropper is viewing (or potentially viewing) a display 806; determining that sensitive or confidential information is being, or about to be, displayed 808; directing corrective actions, locally and/or remotely, to be taken to enhance security 810; sending a warning to an authorized user or owner of the computing device that a potential eavesdropper exists 812; and/or directing other corrective or remedial actions 814. The method 800 may include additional, fewer, or alternative actions, including those discussed elsewhere herein.

The method 800 may include detecting a triggering event (either locally or remotely) to turn on an eavesdropping functionality and/or a user-facing camera 802. The triggering events may include those discussed elsewhere herein. For instance, one or more processors may determine that the computing device is traveling (such as from GPS data), at an airport, away from work, and/or away from home. The one or more processors may then place the computing device into a traveling, airport mode, "not at work" mode, and/or "not at home" mode, respectively, during which the eavesdropping functionality and/or a user-facing camera may be turned on. After which, the method 800 may include turning on the eavesdropping functionality and/or user-facing camera, and recording image data 804.

The method 800 may include analyzing the image data locally and/or remotely to detect an unauthorized view or potential eavesdropper is viewing, or potentially viewing, a display 806. For instance, the image data may analyzed by one or more processors using facial recognition, eye recognition, or facial feature recognition techniques.

The method 800 may include determining that sensitive or confidential information is being, or about to be, displayed 808. For instance, the one or more processors may identify that information to be displayed on a display includes account or address information, or other numeric or personal information.

The method 800 may include directing corrective actions, locally and/or remotely, to be taken to enhance security 810. For instance, the method may include (i) blurring any and all sensitive or confidential information that is being, or about to be displayed, on the display 810A; (ii) removing or preventing any sensitive or confidential information from being displayed 810B; and/or (iii) preventing the user or computing device from accessing a specific website (that may display sensitive or confidential information) and/or direct a user to secondary website that does not display sensitive or confidential information.

The method 800 may include sending a warning to an authorized user or owner of the computing device to a potential eavesdropper exists 812. For instance, a warning may be displayed on the display to warn or alert the user of potential danger. The method 800 may also include directing other corrective or remedial actions 814, such as those discussed with respect to FIG. 7.

XIII. Exemplary Hiding of Sensitive Information

In one aspect, a computer-implemented method of hiding sensitive information may be provided. The method may include (1) commencing or executing, via one or more processors, an eavesdropper detection functionality or application; (2) detecting, via the one or more processors (and/or the eavesdropper detection functionality or application), an unauthorized viewer or eavesdropper is viewing or potentially viewing, a display screen, such as a display screen associated with a computing device; (3) determining, via the one or more processors (and/or the eavesdropper detection functionality or application), that sensitive or confidential information is being displayed, and/or about to be displayed, on the display screen; and/or (4) preventing, via the one or more processors (and/or the eavesdropper detection functionality or application), the unauthorized viewer or eavesdropper from viewing the sensitive or confidential information via the display screen to facilitate hiding sensitive or confidential information and/or maintaining secrecy thereof. The method may include additional, fewer, or alternate actions, including those discussed elsewhere herein.

For instance, preventing, via the one or more processors, the unauthorized viewer or eavesdropper from viewing or potentially viewing the sensitive or confidential information via the display screen may be accomplished by the one or more processors (and/or the eavesdropper detection functionality or application): (a) blurring or masking only the sensitive or confidential information that is being displayed, or about to being displayed, on the display screen (while leaving non-sensitive or non-confidential information un-blurred or un-masked); (b) removing (or taking down) only the sensitive or confidential information from being displayed on the display screen (while leaving non-sensitive or non-confidential information un-blurred or un-masked); (c) preventing any sensitive or confidential information (and only the sensitive or confidential information) that is about to be displayed on the display screen from being displayed (i) before it is displayed, (ii) at all, or (iii) otherwise in the first place; and/or (d) generating a warning (or communication) to an authorized user or owner of the computing device that an eavesdropper or unauthorized user is viewing, or potentially viewing, the display screen, and displaying the warning on the display to the authorized user or owner.

Detecting, via the one or more processors, an unauthorized viewer or eavesdropper is viewing, or potentially viewing, the display screen may include: taking or capturing one or more images via a camera mounted on the computing device, such as under the direction or control of (i) the one or more processors, and/or (ii) the eavesdropper detection functionality or application; and/or analyzing the one or more images, or associated image data, via (i) the one or more processors, and/or (ii) the eavesdropper detection functionality or application to determine that a potential eavesdropper or unauthorized user is viewing (or potentially viewing or looking at) the display screen, such as by using facial recognition, eye recognition, and/or facial feature recognition techniques.

Detecting, via the one or more processors, that the unauthorized viewer or eavesdropper is viewing or potentially viewing the display screen may include: (A) taking or capturing one or more images via a camera mounted on the computing device, such as under the direction or control of the (i) one or more processors, and/or (ii) eavesdropper detection functionality or application; and/or analyzing the one or more images, or associated image data, via the (i) one or more processors, and/or (ii) eavesdropper detection functionality or application to determine characteristics of a person that is looking at, viewing, or potentially viewing the display screen, such as by using facial recognition, eye recognition, and/or other facial feature recognition techniques; (B) comparing the characteristics of the person with facial, eye, and/or other facial characteristics of the authorized user or owner to determine whether the person is the authorized user or owner, or a potential eavesdropper (e.g., no match=potential eavesdropper; match=authorized user or owner); and/or (C) blurring any (and/or only) sensitive or confidential information when it is determined that the potential eavesdropper is viewing, or potentially viewing, the display screen.

The one or more processors may be local to the computing device (such as mounted internally within the computing device), and/or the eavesdropper detection functionality or application may be stored in a non-transitory memory unit or computer-readable medium associated with, or mounted within or internal to, the computing device. Additionally or alternatively, the one or more processors may be remote to the computing device, such as being associated with a remote processor or server in wireless communication with the computing device, and/or the eavesdropper detection functionality or application may be stored in a non-transitory memory unit or computer-readable medium associated with, or mounted within, the remote processor or server.

The method may include determining, via the one or more processors, that a user is accessing the internet or other wireless communication network, and/or is directing the computing device to a website associated with a bank, financial services provider, and/or insurance provider before (or alternatively after) commencing or executing, via the one or more processors, an eavesdropper detection functionality or application.

Preventing, via the one or more processors, the unauthorized viewer or eavesdropper from viewing, or potentially viewing, the sensitive or confidential information via the display screen may be accomplished by the one or more processors (and/or the eavesdropper detection functionality or application): (i) preventing internet access to the website; and/or (ii) directing the user to a secondary website associated with the bank, financial services provider, and/or insurance provider where only limited, or even no, confidential or sensitive information may be displayed and/or accessed.

XIV. Exemplary Enhancing Information Security

In one aspect, a computer-implemented method of enhancing data security may be provided. The method may include (1) turning on or commencing, via one or more local or remote processors, (i) an eavesdropping detection functionality or application, and/or (ii) a user-facing camera associated with, or mounted on, a computing device when a trigger event is detected by the one or more local or remote processors; (2) directing or controlling, via the one or more local or remote processors (and/or the eavesdropping detection functionality or application), the user-facing camera to gather, collect, or otherwise take images or image data; (3) analyzing, via the one or more local or remote processors (and/or the eavesdropping detection functionality or application), the images or image data to detect that an eavesdropper or unauthorized user is viewing, or potentially viewing, a display of the computing device; (4) determining, via the one or more local or remote processors (and/or the eavesdropping detection functionality or application), that sensitive or confidential information is being displayed, or about to be displayed, on the display; and/or (5) directing one or more corrective or remedial actions, via the one or more local or remote processors (and/or the eavesdropping detection functionality or application), when (i) the eavesdropper or unauthorized user is viewing, or potentially viewing, the display, and/or (ii) the sensitive or confidential information is being displayed, or about to be displayed, on the display to enhance security of the sensitive or confidential information. The method may include additional, fewer, or alternate functionality, including that discussed elsewhere herein.

For instance, the trigger event that is detected by the one or more local or remote processors may include: (a) user-selected operations, input, and/or functionality, such as turning on a travel or airport mode; (b) the one or more local or remote processors automatically determining that the computing device is traveling or otherwise not within its normal area of travel or at its normal location (e.g., a residence or place of work), such as by using coordinates from a GPS (Global Positioning System) unit mounted on, or within, the computing device; and/or (c) accessing a landing page or other webpage associated with a financial services provider or insurance provider.

The eavesdropper detection functionality may be triggered, and/or the camera turned on, by: (a) functionality that is triggered or governed by computing device location; and/or (b) functionality that is triggered by internet or wireless communication network activity, such as accessing a landing page or other webpage associated with a specific website, a financial services provider, or an insurance provider.

Analyzing, via the one or more local or remote processors (and/or the eavesdropping detection functionality or application), the images or image data to detect an eavesdropper or unauthorized user is viewing, or potentially viewing, a display of the computing device may include the one or more local or remote processors (and/or the eavesdropping detection functionality or application) analyzing the images or image data to detect that (a) two or more pair of eyes are looking at, or primarily or potentially looking at, the display for a given amount of time or a temporal threshold; (b) two or more pair of eyes are looking at, potentially looking at, or substantially or approximately looking at the display for a given amount of time or a temporal threshold; (c) two or more pair of heads are looking in the direction of, or primarily looking in the direction of, the display for a given amount of time or a temporal threshold; and/or (d) two or more pair of heads are looking in the direction of, primarily looking in the direction of, or substantially or approximately looking in the direction of the display for a given amount of time or a temporal threshold (such as 15 or 30 seconds).

Directing the one or more corrective or remedial actions, via the one or more local or remote processors (and/or the eavesdropping detection functionality or application), may include (a) blurring or masking all (and/or only) sensitive or confidential information from being displayed on any and all portions of the display (i.e., remove any sensitive or confidential information from being displayed anywhere or on any webpage of the display); (b) preventing the computing device from accessing a given website associated with a bank, financial services provider, or insurance provider; (c) removing any (and/or only) sensitive or confidential information that is being displayed and/or preventing the computing device from displaying any sensitive or confidential information until it is determined that the eavesdropper or unauthorized user is no longer viewing, or potentially viewing, the display (such as for a temporal threshold of 60 seconds or longer); and/or (d) generating a warning to an authorized user of the computing device and displaying the warning on the display.

XV. Exemplary Method for Displaying a Potential Eavesdropper

Figure 9:
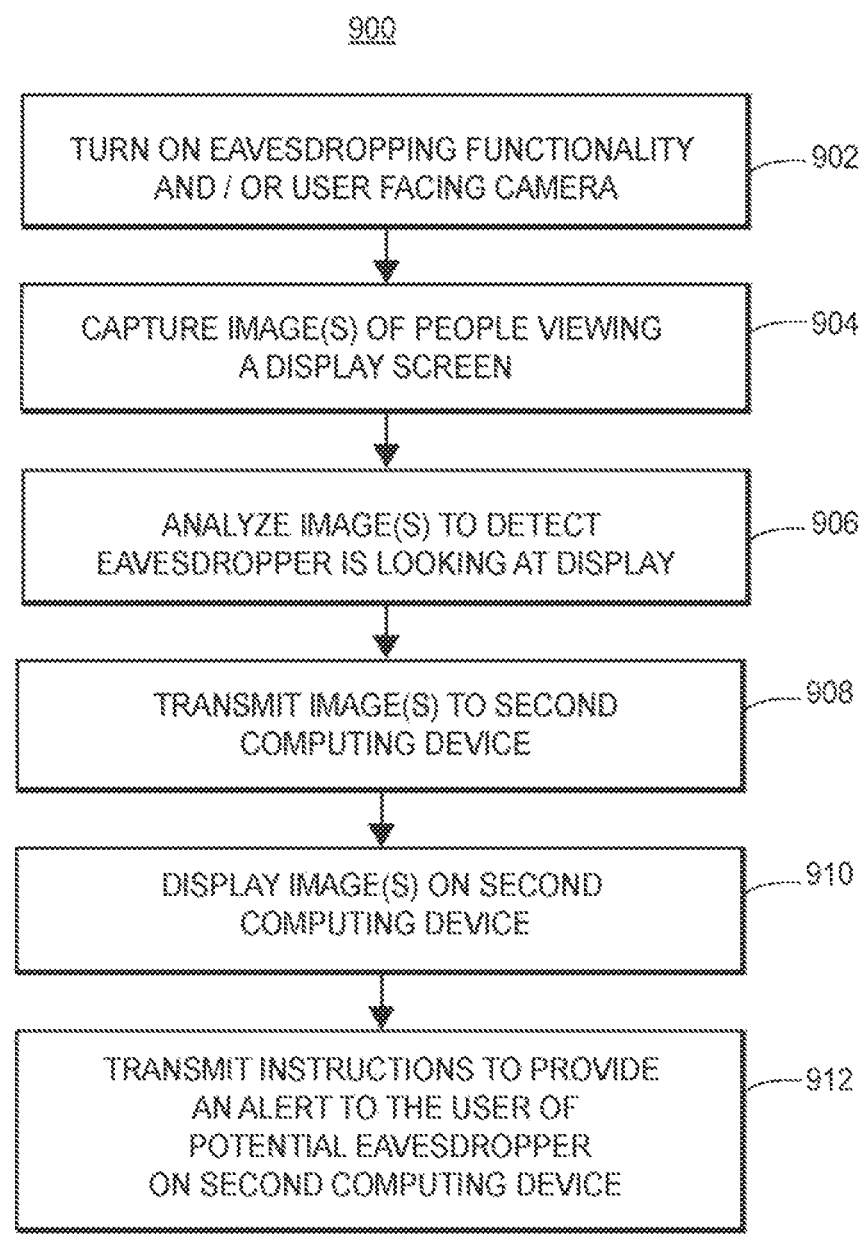
FIG. 9 is a flow chart illustrating an exemplary method for displaying a potential eavesdropper.

FIG. 9 illustrates an exemplary computer-implemented method 900 for displaying a potential eavesdropper. The method may be executed on the computing device 102, as shown in FIG. 1. In some embodiments, the method 900 may be implemented in a set of instructions stored on a non-transitory computer-readable memory and executable on one or more processors of the computing device 102. In other embodiments, the method 900 may be performed by a combination of multiple computing devices 102, such as a smart phone and a smart watch which are in communication with each other.

The method 900 may include turning on eavesdropping detection functionality and/or a user facing camera 902; capturing image(s) of people viewing a display screen 904; analyzing the image(s) to detect an eavesdropper is looking at a display 906; transmitting the image(s) to a second computing device, such as a smart watch 908; displaying the image(s) on the second computing device 910; and transmitting instructions to provide an alert to the user of a potential eavesdropper on the second computing device 912. The method may include additional, fewer, or alternate actions, including those discussed elsewhere herein.

At block 902, a first computing device, such as a smart phone may turn on eavesdropping detection functionality and/or a user facing camera. For instance, the first computing device may start the eavesdropping detection functionality and/or user facing camera when a trigger or triggering event is detected or otherwise determined, such as those discussed elsewhere herein. The triggering events may include accessing various websites, turning on the computing device or starting various functionality or applications, entering various modes of computing device operation (such as a traveling mode, "not at home" mode, "not at work" mode, or a roaming mode), GPS or other location-based functionality, and/or other triggers.

Then at block 904, the first computing device (and/or the eavesdropping detection functionality) may direct one or more cameras or other sensors (such as thermal imaging sensors) to gather and collect image data, such as one or more digital images containing information of persons looking at, or potentially viewing, a display screen or other display associated with the first computing device. The first computing device may analyze the digital image(s) to detect an eavesdropper looking at a display, such as discussed elsewhere herein (block 906). For example, if two or more people appear to be viewing or facing the display screen or other display of the computing device for (i) too long a time, or (ii) too much within a given time period, the first computing device (and/or the eavesdropping detection functionality) may determine that an eavesdropper, or potential eavesdropper, is viewing (or potentially viewing) the display screen or other display.

In some embodiments, the eavesdropping detection functionality may compare biometric identifiers for each of two or more people who appear to be viewing or facing the display screen to determine if the detected biometric identifiers match one or more biometric fingerprints associated with the user account. Example biometric identifiers may include facial recognition, eye recognition, facial structure recognition, ear or nose recognition, hair or teeth recognition, etc. The biometric identifiers may also be compared to biometric fingerprints associated with unauthorized users.

If a biometric identifier for one of the people does not match the biometric fingerprints associated with the user account and/or the biometric identifier matches a biometric fingerprint associated with an unauthorized user, the person may be identified as an eavesdropper or potential eavesdropper.

As a result, the first computing device may transmit the digital image(s) to a second computing device (block 908), such as a smart watch. The digital image(s) may be transmitted via a short range communication network, such as Bluetooth, Wi-Fi Direct, wired or wireless USB, NFC, ZigBee, LAN, or any other suitable short range communication network. In this manner, the second computing device may display the digital image(s) (block 910) for the user to see, acting as a rear-view mirror for the user. In some embodiments, the digital image(s) may display the eavesdropper or potential eavesdropper without displaying the user. For example, each digital image may be filtered to remove the portion of the digital image which contains the user. Then the filtered digital image(s) may be transmitted to the second computing device.

Also in some embodiments, the first computing device may display the digital image(s) on a portion of the user interface of the first computing device, such as the upper right, upper left, lower right, or lower left corner of the user interface. For example, the digital image(s) may be displayed in the upper right corner of the user interface overlaying data items (e.g., for an insurance policy) which are displayed within the viewport of the user interface. Furthermore, each digital image may be a still image or video, and may be displayed on a portion of the user interface and/or transmitted to the second computing device in real-time or at least near-time. Advantageously, the user may see real-time or near real-time video/images of the people looking at her screen.

When the digital image(s) is/are transmitted from the first computing device to the second computing device, the first computing device may also transmit instructions for the second computing device to provide an alert to the user notifying her that an image of the potential eavesdropper is being displayed on the second computing device (block 912). For example, the second computing device may provide an audible alert to the user such as ringtone, a beeping sound, etc., the second computing device may provide a haptic alert to the user, and/or the second computing device may provide a visual alert to the user, such as a push notification.

In some embodiments, when the image of the potential eavesdropper is displayed on one or both of the first and second computing devices, the user may perform a gesture based action on the computing device which displays the image, such as a swipe gesture to ignore the image of the potential eavesdropper and remove the image from the display. When the user performs this action, she may be prompted to indicate whether the potential eavesdropper should be ignored temporarily or if the potential eavesdropper should be permanently ignored and/or she may be prompted to request that the eavesdropping detection functionality be turned off. If the user indicates that the potential eavesdropper should be permanently ignored, for example by clicking on and/or touch-selecting a user control, the eavesdropping detection functionality may add the biometric identifier for the potential eavesdropper as a biometric fingerprint associated with authorized users.

For example, if the potential eavesdropper is the user's brother, the user may perform a swipe gesture indicating that the image should be ignored and she may further indicate, via a user control, that the image should be ignored permanently. As a result, the biometric identifier for the brother may be stored as a biometric fingerprint associated with authorized users in the user account.

XVI. Exemplary Displaying a Potential Eavesdropper

In one aspect, a computer-implemented method for displaying potential eavesdroppers when hiding sensitive information may be provided. The method may include (1) commencing (via one or more processors in a first computing device) an eavesdropping detection functionality in response to detecting a trigger event; (2) directing (via the one or more processors in the first computing device) a camera mounted on the first computing device to capture one or more images including one or more persons looking at or potentially viewing a display screen on the first computing device; (3) analyzing (via the one or more processors in the first computing device) the one or more images to detect an unauthorized viewer or eavesdropper is viewing, or potentially viewing, the display screen on the first computing device; and/or (4) transmitting (via the one or more processors in the first computing device and/or wired or wireless communication and/or data transmission) the one or more images which include the unauthorized viewer or the eavesdropper to a second computing device to be displayed to a user on the second computing device. The method may include additional, fewer, or alternative actions, including those discussed elsewhere herein.

For instance, the method may include transmitting (via the one or more processors in the first computing device and/or wired or wireless communication and/or data transmission) instructions to the second computing device to provide an alert to the user that one or more images of the unauthorized viewer or the eavesdropper are being displayed on the second computing device. Moreover, in response to receiving a gesture by the user on the display of the second computing device, the method may include creating (via the one or more processors in the first computing device) a biometric fingerprint associated with authorized users based upon a biometric identifier for the unauthorized viewer or eavesdropper. Additionally, in response to receiving a gesture by the user on the display of the second computing device, the method may include turning off (via the one or more processors in the first computing device) the eavesdropping detection functionality.

Furthermore, the method may include displaying (via the one or more processors in the first computing device) the one or more images which include the unauthorized viewer or eavesdropper on a portion of the display screen on the first computing device. The method may also include displaying (via the one or more processors in the first computing device) one or more data items on a viewport of the display screen on the first computing device. The one or more images which include the unauthorized viewer or eavesdropper may be displayed overlaying at least a portion of the viewport. Also, the one or more images may be transmitted to the second computing device in real-time.

XVII. Exemplary Smart Watch Functionality

In one aspect, a front facing camera may detect other faces or eyes within the camera's view or line of sight, such as a front facing camera mounted on a laptop, tablet, phablet, smart phone, or other mobile device. If the user also has a smart watch, what the camera is seeing may be displayed on the smart watch face or display. In other words, the smart watch may act as a rearview mirror of sorts and/or displays eavesdroppers situated or located behind (or over the shoulder of) the user.

A mobile device, such as laptop or tablet, may include facial detection and/or facial recognition software or computer instructions (and other functionality as discussed herein). The mobile device may be able to recognize authorized users and unauthorized users of the mobile device. The mobile device may be in wireless communication or data transmission with the mobile device owner's smart watch, such as via Bluetooth or other wireless communication techniques.

If an unauthorized or unrecognized user's eyes or face is detected by the mobile device (e.g., laptop or tablet), a notification may be pushed to the user's smart watch. After which, the user may be aware of the eavesdropper and take precautions, or alternatively ignore the notification if the potential eavesdropper is someone the user knows, but the mobile does not recognize as of yet (e.g., her face hasn't been photographed and stored in a local memory of the mobile device as of yet). In the latter case, the user may opt to add the potential eavesdropper identified (and/or picture thereof) to a list of known "friendlies" or authorized users, such as by pressing an icon displayed on the mobile device or smart watch.

Figure 10:
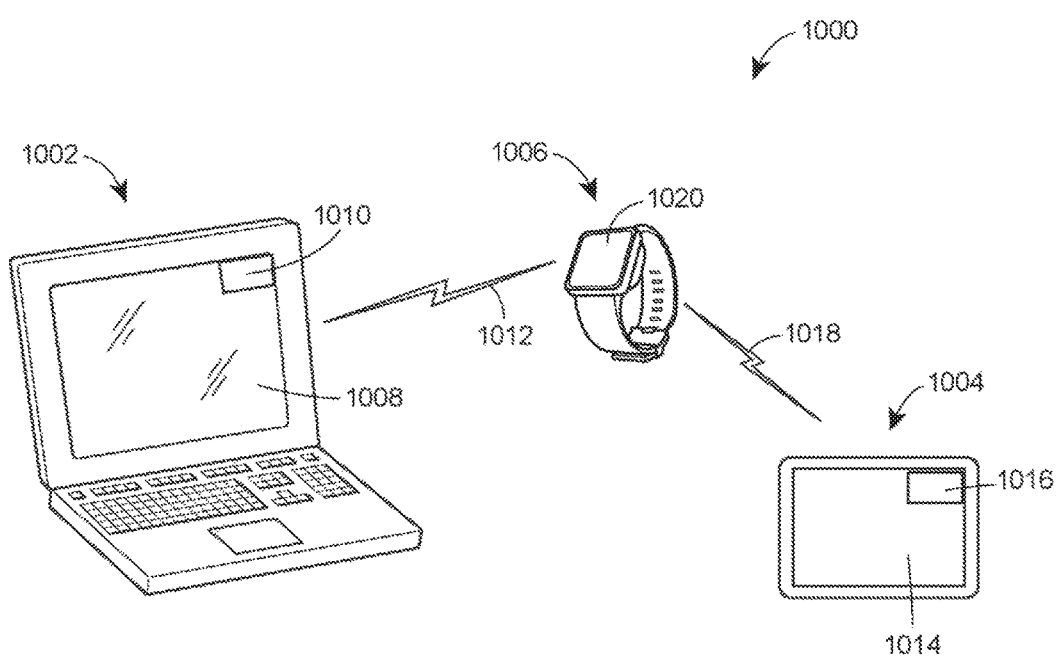
FIG. 10 illustrates an exemplary computer system to detect eavesdroppers and transmit push notifications to a user's smart watch.

FIG. 10 illustrates an exemplary computer system to detect eavesdroppers and transmit push notifications to a user's smart watch 1000. The computer system may include a mobile device (such as a laptop 1002 or tablet 1004) in wireless communication 1012, 1018 with a smart watch 1006, such as via Bluetooth techniques. The laptop 1002 and tablet 1004 may each include a display screen 1008, 1014 and front facing camera (not shown).

The laptop 1002 and tablet 1004 may each include a window 1010, 1016, such as a pop-up window, for displaying notifications that a potential eavesdropper has been detected using the camera and facial/eye recognition and/or detection techniques. The techniques may include functionality that recognizes authorized users and/or detects unrecognized or presently unauthorized users.

When the laptop 1002 or tablet 1004 detects an unauthorized or unrecognized person (such as by comparing images of her face or eyes with a list of images of faces or eyes of authorized users stored in a local memory), the laptop 1002 or tablet 1004 may push a notification to the smart watch 1006. For instance, an audible or visual notification may be sent to the smart watch 1006. In one embodiment, the smart watch 1006 display screen 1020 may display an image of the unauthorized or unrecognized person captured by the front facing camera mounted on the laptop 1002 or tablet 1004. Additionally or alternatively, the smart watch 1006 display screen 1020 may display a streaming video of the unauthorized or unrecognized person captured by the front facing camera mounted on the laptop 1002 or tablet 1004 (to function as a rear view mirror and potentially allow the user to eavesdrop on the eavesdropper. As a result, the user can learn whether or not the potential eavesdropper is a threat without the potential eavesdropper knowing they've been detected).

A notification/message may also be pushed from the laptop 1002 or tablet 1004 to the smart watch 1006 asking the user if they would like to add the image of the unauthorized or unrecognized person to a list of images associated with authorized users of the devices 1002, 1004, and/or 1006.

XVIII. Exemplary Mobile Device & Smart Watch

In one aspect, a mobile device (associated with a user) for displaying potential eavesdroppers when hiding sensitive information may be provided. The mobile device may include a processor configured to: (1) commence an eavesdropping detection functionality in response to detecting a trigger event; (2) direct a camera mounted on the mobile device to capture one or more images including one or more persons looking at or potentially viewing a display screen on the mobile device; (3) analyze the one or more images to detect an unauthorized viewer or eavesdropper is viewing, or potentially viewing, the display screen on the mobile device; (4) generate a push notification message indicative of potential eavesdropping; and/or (5) transmit from a mobile device transceiver the push notification message to a smart watch also associated with the user to alert the user that a potential eavesdropper may be viewing their mobile device display screen. The mobile device and smart watch may include additional, less, or alternate functionality, including that discussed elsewhere herein.

For instance, the push notification message may include the one or more images which include the unauthorized viewer or the eavesdropper to facilitate the images being displayed on the user's smart watch. The mobile device may be configured to, in response to receiving a gesture by the user on the display of the smart watch, create a biometric fingerprint associated with authorized users based upon a biometric identifier for the unauthorized viewer or eavesdropper. The mobile device may be configured to, in response to receiving a gesture by the user on the display of the smart watch, turn off the eavesdropping detection functionality. The mobile device may be configured to display one or more data items on a viewport of the display screen, wherein the one or more images which include the unauthorized viewer or eavesdropper may be displayed overlaying at least a portion of the viewport. The one or more images may be transmitted to the smart watch in real-time and displayed on the smart watch display.

In another aspect, a computer system for detecting and displaying potential eavesdroppers, such as when displaying or hiding sensitive information on a mobile device display screen, may be provided. The computer system may include a mobile device having a processor, memory, front facing camera, a transceiver, and a display screen; and a smart watch having a processor, memory, a transceiver, and a display screen. The mobile device processor may be configured to (i) direct the front facing camera to acquire one or more images; (ii) detect a face or eyes of a potential eavesdropper in the one or more images (such as by executing facial or eye recognition techniques or instructions stored in the memory); (iii) compare the one or more images of the potential eavesdropper with a list of images of authorized users of the mobile device to confirm that the potential eavesdropper is an unrecognized or unauthorized user of the mobile device; and/or (iv) when an unrecognized or unauthorized user of the mobile device has been identified within the images by the processor, generate an electronic notification indicative of potential eavesdropping and transmit the electronic notification via wireless communication and/or data transmission using the transceiver to the transceiver of the smart watch. The smart watch may be configured to receive the electronic notification via the smart watch transceiver from the mobile device transceiver and display the electronic notification on the smart watch display screen to alert the user of potential eavesdropping of information being displayed on the mobile device via the smart watch.

The computer system may include additional, less, or alternate functionality, including that discussed elsewhere herein. For instance, the electronic notification may include one or more images, or streaming video, of the potential eavesdropper that was captured by the mobile device's camera and is displayed on the smart watch display in substantially real time. The electronic notification may allow the user to add an image of the potential eavesdropper to a list of images of known or authorized users stored in a memory unit of the mobile device. The mobile device may be configured to, in response to receiving a gesture by the user on the display of the smart watch, turn off the eavesdropping detection functionality.

Figure 11:
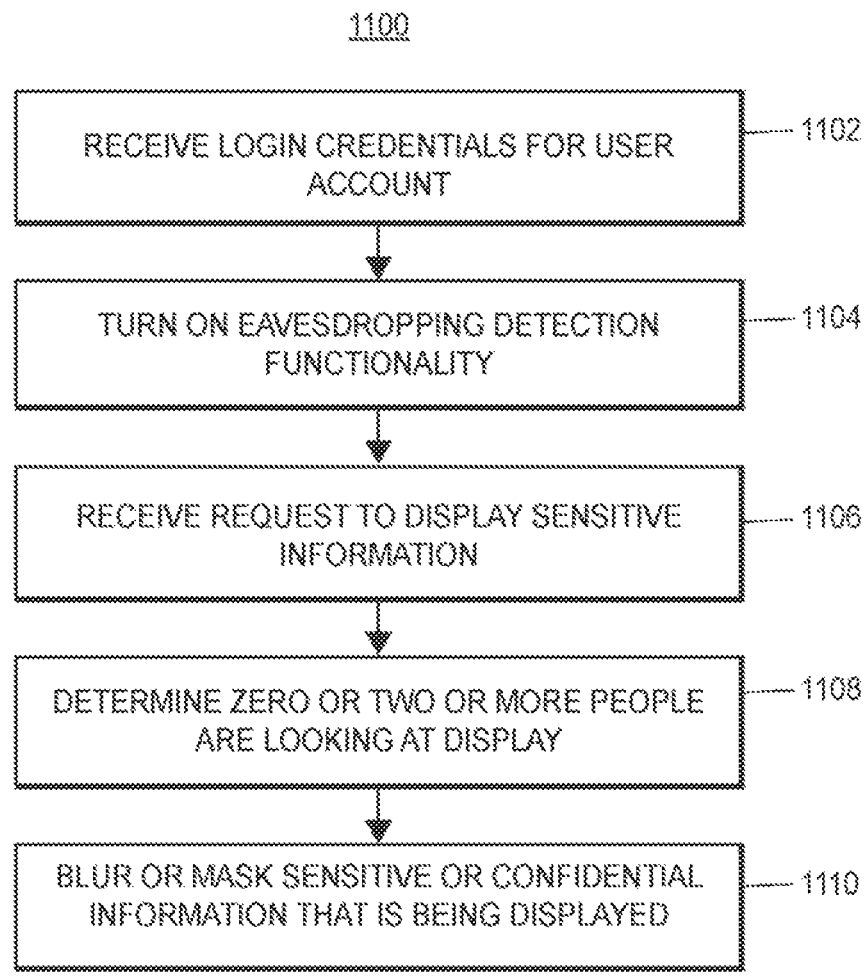
FIG. 11 is a flow chart illustrating an exemplary method for hiding sensitive information including when no one is looking at the display screen.

XIX. Exemplary Method for Hiding Sensitive Information Including when No One is Looking at the Display Screen In some embodiments, the computing device may determine that no one is looking at the display of the computing device, and as a result, may blur or obscure the viewport of the display. FIG. 11 illustrates an exemplary computer-implemented method 1100 for hiding sensitive information including when zero faces are detected. The method may be executed on the computing device 102, as shown in FIG. 1. In some embodiments, the method 1100 may be implemented in a set of instructions stored on a non-transitory computer-readable memory and executable on one or more processors of the computing device 102.

The method 1100 may include receiving login credentials for a user account 1102; turning on eavesdropping detection functionality and/or a user facing camera 1104; receiving a request to display sensitive information 1106; determining that zero or two or more people are looking at the display 1108; and/or blurring or masking the sensitive or confidential information that is being displayed 1110. The method may include additional, fewer, or alternate actions, including those discussed elsewhere herein.

A user, such a customer of an insurance company, a customer of a banking company, a holder of an insurance policy and/or bank account, a beneficiary of an insurance policy and/or bank account, a claimant, an insurance agent associated with the company or some other employee or independent contractor affiliated with the company, may use a client device, such as the computing device 102 illustrated in FIG. 1, to access a program that accesses sensitive data. For example, the program may be for banking, finance, insurance, etc. The company program may be a native application, a web application hosted on one or more servers, such as the server 114, described in reference to FIG. 1, a combination of the two, etc.

The user may enter an input, via a mouse click, touch press, keyboard click, etc., representing one or more login credentials and the one or more login credentials may be received at the computing device, for example, to log in to an application which displays sensitive data (block 1102). For example, the login credentials may be a customer name associated with a company account, a user name of the customer account, etc. In some embodiments, the user may be a customer entering a user account credential. In some embodiments, the computing device may also verify the login credentials via the use of a password or other verification technique. The computing device may further transmit the received customer account identification and/or verification information to a second computing device, such as an authentication server, for authentication.

At block 1104, the computing device may turn on eavesdropping detection functionality and/or a user facing camera. For instance, the computing device may start the eavesdropping detection functionality and/or user facing camera when a trigger or triggering event is detected or otherwise determined, such as those discussed elsewhere herein. The triggering events may include accessing various websites, turning on the computing device or starting various functionality or applications, entering various modes of computing device operation (such as a traveling mode, "not at home" mode, "not at work" mode, or a roaming mode), GPS or other location-based functionality, and/or other triggers.

Then, at block 1106, the computing device may receive a request to display sensitive data on a display of the computing device. As described above, this request may be a variety of things. For example, the user may have requested an account balance, transaction number, contact information, etc. In some embodiments, the computing device may alternatively or additionally determine that a user has accessed a sensitive data portion of an application, such as a transaction history or policy details portion, and/or determine that sensitive data is about to be, or currently being, displayed within the viewport of the display of the computing device.

The computing device may direct one or more cameras or other sensors (such as thermal imaging sensors) to gather and collect image data, such as a digital image containing information of persons looking at, or potentially viewing, a display screen or other display associated with the computing device. At block 1108, the computing device may analyze the digital image to detect whether zero or two or more people are viewing or facing the display screen. For instance, the image data may be analyzed by the computing device using facial recognition, eye recognition, or facial feature recognition techniques.

If two or more people appear to be viewing or facing the display screen or other display of the computing device for (i) too long a time, or (ii) too much within a given time period, the computing device (and/or the eavesdropping detection functionality) may determine that an eavesdropper, or potential eavesdropper, is viewing (or potentially viewing) the display screen or other display. Moreover, if no one is viewing or facing the display screen, the computing device (and/or the eavesdropping detection functionality) may determine that the user is not looking at the sensitive data and that the sensitive data should be blurred or masked while the user is not looking.

When zero or two or more people are viewing or facing the display screen, the computing device may blur or mask the sensitive data or confidential information within the viewport of the display of the computing device (block 1110). In some embodiments, the sensitive data or confidential information may be blurred or masked immediately upon detecting that zero people are viewing or facing the display screen. For example, if the user looks away from the display screen momentarily, the sensitive data or confidential information may be blurred immediately to reduce the risk of a potential eavesdropper viewing the sensitive data or confidential information. Then when the user looks back at the display screen, as detected by the eavesdropping detection functionality, the sensitive data or confidential information may be revealed to the user.

If zero people are viewing or facing the display screen for more than a predetermined amount of time (e.g., ten minutes), the computing device may automatically log the user out of the application from which she is viewing sensitive data or confidential information. For example, the computing device may remove the login credentials which were entered by the user to log in to the application.

Additionally, the computing device may continuously collect/analyze image data to determine the amount of users viewing or facing the display screen when sensitive data is being displayed within the viewport of the display. In other embodiments, the computing device may collect/analyze image data at predetermined time intervals (e.g., every minute, every two minutes, etc.). When zero people are viewing or facing the display screen at a first time and the computing device determines at a second time (e.g., two minutes later) that one person is viewing or facing the display screen (as detected by the eavesdropping detection functionality using facial recognition, eye recognition, or facial feature recognition techniques), the computing device may verify that the person viewing or facing the display screen at the second time is the user. For example, the computing device may verify that the person viewing or facing the display screen at the second time is the user by detecting a biometric identifier for the person. The biometric identifier may include facial recognition, eye recognition, facial structure recognition, eye or nose recognition, hair or teeth recognition, etc. Numerous biometric identification techniques are known in the art, and those of ordinary skill in the art will recognize that any combination of these techniques may be used to identify the person.

The biometric identifier for the person viewing or facing the display screen at the second time may be compared to a biometric fingerprint for the user. For example, the biometric fingerprint may define a user's face, eye or eyes, hair color, hair style, facial features, teeth or jaw structure, nose, ears, etc. If the biometric identifier of the person viewing or facing the display screen at the second time matches a biometric fingerprint belonging to the user, the sensitive data may be revealed on the display screen. On the other hand, if the biometric identifier does not match the biometric fingerprint, the computing device may continue to blur or mask the sensitive data or confidential information within the viewport of the display. The method may include additional, fewer, or alternate actions, including those discussed elsewhere herein.

XX. Exemplary Hiding of Sensitive Information Including when No One is Looking at the Display Screen In one aspect, a computer-implemented method for hiding sensitive information including when no one is looking at the display screen may be provided. The method may include (1) determining, via one or more processors (and/or the eavesdropper detection functionality or application), that confidential or sensitive information is being displayed on a display screen of a computing device of a user; (2) collecting, via the one or more processors (and/or the eavesdropper detection functionality or application), image data from a front facing camera in communication with the computing device of the user; (3) determining, via the one or more processors (and/or the eavesdropper detection functionality or application), that zero or two or more people are viewing the display screen from computer analysis of the collected image data: and/or (4) blurring or obscuring, via the one or more processors (and/or the eavesdropper detection functionality or application), the confidential or sensitive information being displayed on the display screen when it is determined that the zero or two or more people are viewing the display screen.

For instance, when zero people are viewing the display screen, the method may include blurring or obscuring, via the one or more processors, the confidential or sensitive information immediately upon determining that zero people are viewing the display screen; and/or when more than a predetermined amount of time passes after the one or more processors determine that zero people are viewing the display screen, automatically removing, via the one or more processors, login credentials of the user for an application which includes the confidential or sensitive information.

Furthermore, after determining that zero people are viewing the display screen at a first time, the method may include collecting, via the one or more processors, second image data from the front facing camera at a second time; determining, via the one or more processors, that one person is viewing the display screen at the second time based upon the second image data; and/or verifying, via the one or more processors, that the person viewing the display screen at the second time is the user.

Verifying that the person viewing the display screen at the second time is the user may include detecting, via the one or more processors, a biometric identifier belonging to the person viewing the display screen; and/or comparing, via the one or more processors, the biometric identifier to a biometric fingerprint for the user.

When the biometric identifier matches the biometric fingerprint based upon the comparison, the method may further include revealing, via the one or more processors, the confidential or sensitive information being displayed on the display screen. On the other hand, when the biometric identifier does not match the biometric fingerprint based upon the comparison, the method may include further blurring or obscuring, via the one or more processors, the confidential or sensitive information.

In another aspect, a computing or mobile device configured to hide sensitive information when no one, including the user, is looking at a display screen may be provided. The computing or mobile device may include one or more processors configured to: (1) determine that confidential or sensitive information is being displayed on a display screen of the computing or mobile device of a user; (2) collect image data from a front facing camera in communication with, or mounted on, the computing or mobile device of the user; (3) determine that zero, or two or more, people are viewing the display screen from computer analysis of the collected image data; and/or (4) blur or obscure the confidential or sensitive information being displayed on the display screen when it is determined that the zero or two or more people are viewing the display screen to facilitate protecting confidential or sensitive information from eavesdroppers. The computing or mobile device may include additional, less, or alternate functionality, including that discussed elsewhere herein.

For instance, when zero people are viewing the display screen, the one or more processors further: blur or obscure the confidential or sensitive information immediately upon determining that zero people are viewing the display screen; and/or when more than a predetermined amount of time passes after the one or more processors determine that zero people are viewing the display screen, automatically remove login credentials of the user for an application which includes the confidential or sensitive information. After determining that zero people are viewing the display screen at a first time: the one or more processors may collect second image data from the front facing camera at a second time; determine that one person is viewing the display screen at the second time based on the second image data; and/or verify that the person viewing the display screen at the second time is the user.

Verifying that the person viewing the display screen at the second time is the user includes, the one or more processors: detecting a biometric identifier belonging to the person viewing the display screen; and/or comparing the biometric identifier to a biometric fingerprint for the user. When the biometric identifier matches the biometric fingerprint based upon the comparison, the one or more processors may reveal the confidential or sensitive information being displayed on the display screen. And when the biometric identifier does not match the biometric fingerprint based upon the comparison, the one or more processors may blur or obscure the confidential or sensitive information.

XXI. Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the computing device 104, the server 112, or any combination of computing devices within the system 100). The routines may be included as part of any of the modules described in relation to FIG. 1 or 2 or as part of a module that is external to the system illustrated by FIGS. 1 and 2. For example, the methods may be part of a browser application or an application running on the computing device 104 as a plug-in or other module of the browser application. Further, the methods may be employed as "software-as-a-service" to provide a computing device 104 with access to the quote system 110.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments may be implemented, using either current technology or technology developed after the filing date of this patent, which would still fall within the scope of the claims.

Upon reading this disclosure, those of skill in the art will appreciate still additional alternative structural and functional designs for system and method for concealing sensitive data on a computing device. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method for hiding sensitive information including when no one is looking at a display screen, the method comprising:
    determining, by one or more processors, that confidential or sensitive information is being displayed on a display screen of a computing device of a user;
    collecting, by the one or more processors, image data from a front facing camera in communication with the computing device of the user;
    determining, by the one or more processors, that zero people are viewing the display screen for more than a threshold duration of at least one second from computer analysis of the collected image data; and
    blurring or obscuring, by the one or more processors, the confidential or sensitive information being displayed on the display screen when it is determined that the zero people are viewing the display screen for more than the threshold duration.

2. The method of claim 1, wherein when zero people are viewing the display screen, the method further comprises:
    blurring or obscuring, by the one or more processors, the confidential or sensitive information immediately upon determining that zero people are viewing the display screen; and
    when more than a predetermined amount of time passes after the one or more processors determine that zero people are viewing the display screen, automatically removing, by the one or more processors, login credentials of the user for an application which includes the confidential or sensitive information.

3. The method of claim 1, further comprising:
    after determining that zero people are viewing the display screen at a first time:
        collecting, by the one or more processors, second image data from the front facing camera at a second time;
        determining, by the one or more processors, that one person is viewing the display screen at the second time based upon the second image data; and
        verifying, by the one or more processors, that the person viewing the display screen at the second time is the user.

4. The method of claim 3, wherein verifying that the person viewing the display screen at the second time is the user includes:
    detecting, by the one or more processors, a biometric identifier belonging to the person viewing the display screen; and
    comparing, by the one or more processors, the biometric identifier to a biometric fingerprint for the user.

5. The method of claim 4, wherein when the biometric identifier matches the biometric fingerprint based upon the comparison, revealing, by the one or more processors, the confidential or sensitive information being displayed on the display screen.

6. The method of claim 4, wherein when the biometric identifier does not match the biometric fingerprint based upon the comparison, further blurring or obscuring, by the one or more processors, the confidential or sensitive information.

7. A computing or mobile device configured to hide sensitive information when no one, including the user, is looking at a display screen, the computing or mobile device comprising one or more processors configured to:
    determine that confidential or sensitive information is being displayed on a display screen of the computing or mobile device of a user;
    collect image data from a front facing camera in communication with, or mounted on, the computing or mobile device of the user;
    determine that zero people are viewing the display screen for more than a threshold duration of at least one second from computer analysis of the collected image data; and
    blur or obscure the confidential or sensitive information being displayed on the display screen when it is determined that the zero people are viewing the display screen for more than the threshold duration to facilitate protecting confidential or sensitive information from eavesdroppers.

8. The computing or mobile device of claim 7, wherein when zero people are viewing the display screen, the one or more processors further:
  blur or obscure the confidential or sensitive information immediately upon determining that zero people are viewing the display screen; and
  when more than a predetermined amount of time passes after the one or more processors determine that zero people are viewing the display screen, automatically remove login credentials of the user for an application which includes the confidential or sensitive information.

9. The computing or mobile device of claim 7, wherein the one or more processors are further configured to:
  after determining that zero people are viewing the display screen at a first time:
    collect second image data from the front facing camera at a second time;
    determine that one person is viewing the display screen at the second time based upon the second image data; and
    verify that the person viewing the display screen at the second time is the user.

10. The computing or mobile device of claim 9, wherein to verify that the person viewing the display screen at the second time is the user, the one or more processors are configured to:
  detect a biometric identifier belonging to the person viewing the display screen; and
  compare the biometric identifier to a biometric fingerprint for the user.

11. The computing or mobile device of claim 10, wherein when the biometric identifier matches the biometric fingerprint based upon the comparison, the one or more processors are configured to reveal the confidential or sensitive information being displayed on the display screen.

12. The computing or mobile device of claim 10, wherein when the biometric identifier does not match the biometric fingerprint based upon the comparison, the one or more processors are configured to further blur or obscure the confidential or sensitive information.

13. A non-transitory computer-readable memory storing thereon instructions that, when executed by one or more processors, cause the one or more processors to:
  determine that confidential or sensitive information is being displayed on a display screen of the computing or mobile device of a user;
  collect image data from a front facing camera in communication with, or mounted on, the computing or mobile device of the user;
  determine that zero people are viewing the display screen for more than a threshold duration of at least one second from computer analysis of the collected image data; and
  blur or obscure the confidential or sensitive information being displayed on the display screen when it is determined that the zero people are viewing the display screen for more than the threshold duration to facilitate protecting confidential or sensitive information from eavesdroppers.

14. The computer-readable memory of claim 13, wherein when zero people are viewing the display screen, the instructions cause the one or more processors to:
  blur or obscure the confidential or sensitive information immediately upon determining that zero people are viewing the display screen; and
  when more than a predetermined amount of time passes after the one or more processors determine that zero people are viewing the display screen, automatically remove login credentials of the user for an application which includes the confidential or sensitive information.

15. The computer-readable memory of claim 13, wherein the instructions further cause the one or more processors to:
  after determining that zero people are viewing the display screen at a first time:
    collect second image data from the front facing camera at a second time;
    determine that one person is viewing the display screen at the second time based upon the second image data; and
    verify that the person viewing the display screen at the second time is the user.

16. The computer-readable memory of claim 15, wherein to verify that the person viewing the display screen at the second time is the user, the instructions cause the one or more processors to:
  detect a biometric identifier belonging to the person viewing the display screen; and
  compare the biometric identifier to a biometric fingerprint for the user.

17. The computer-readable memory of claim 16, wherein when the biometric identifier matches the biometric fingerprint based upon the comparison, the instructions cause the one or more processors to reveal the confidential or sensitive information being displayed on the display screen.

18. The computer-readable memory of claim 16, wherein when the biometric identifier does not match the biometric fingerprint based upon the comparison, the instructions cause the one or more processors to further blur or obscure the confidential or sensitive information.

\* \* \* \* \*